(12) United States Patent
Sprauve et al.

(10) Patent No.: US 7,234,115 B1
(45) Date of Patent: Jun. 19, 2007

(54) HOME ENTERTAINMENT SYSTEM AND METHOD

(75) Inventors: Michael Sprauve, San Jose, CA (US); Manish Thakur, Santa Clara, CA (US); Ravi Verma, Santa Clara, CA (US); Brent Bilger, Los Altos Hills, CA (US)

(73) Assignee: Home Director, Inc., Campbell, CA (US)

( * ) Notice: Subject to any disclaimer, the term of this patent is extended or adjusted under 35 U.S.C. 154(b) by 585 days.

(21) Appl. No.: 10/671,314

(22) Filed: Sep. 24, 2003

Related U.S. Application Data

(60) Provisional application No. 60/414,234, filed on Sep. 26, 2002.

(51) Int. Cl.
 *G06F 13/10* (2006.01)
(52) U.S. Cl. ................................. 715/746; 715/744
(58) Field of Classification Search ............... 715/835, 715/851, 717, 716, 718, 845, 846, 727, 719, 715/764, 735, 744, 745, 746, 747, 762; 455/3.02, 455/3.03, 3.06, 68, 72
 See application file for complete search history.

(56) References Cited

U.S. PATENT DOCUMENTS

| | | | |
|---|---|---|---|
| 4,407,447 A | 10/1983 | Sayegh | |
| 4,514,729 A | 4/1985 | Szarka | |
| 4,959,713 A | 9/1990 | Morotomi et al. | |
| 5,086,385 A | 2/1992 | Launey et al. | |
| 5,285,136 A | 2/1994 | Duhame | |
| 5,305,952 A | 4/1994 | Hannarong | |
| 5,319,698 A | 6/1994 | Glidewell et al. | |
| 5,400,246 A | 3/1995 | Wilson et al. | |
| 5,406,173 A | 4/1995 | Mix et al. | |
| 5,473,202 A | 12/1995 | Mudge et al. | |
| 5,498,931 A | 3/1996 | Bedocs | |
| 5,499,196 A | 3/1996 | Pacheco | |
| 5,510,975 A | 4/1996 | Ziegler, Jr. | |

(Continued)

FOREIGN PATENT DOCUMENTS

JP 06230144 A 8/1994

(Continued)

OTHER PUBLICATIONS

U.S. Appl. No. 09/693,299, filed Oct. 19, 2000, Bilger.

(Continued)

*Primary Examiner*—Ba Huynh
*Assistant Examiner*—TuyetLien Tran
(74) *Attorney, Agent, or Firm*—DLA Piper US LLP

(57) ABSTRACT

An entertainment system and method including controllable components dispersed among a plurality of locations and each having attributes associated therewith, a plurality of interconnections between the controllable components, a plurality of user interface devices, and a controller that generates graphical user interfaces for the user interface devices for controlling the plurality of controllable components. The graphical user interfaces include commands for operating the controllable components that vary among the graphical user interfaces based on the locations of the user interface devices, and the controllable component attributes, locations and interconnections. The controller also automatically creates schematic diagrams, lists, views and test plans for the controlled components and/or the interconnections therebetween based upon the identification of the controlled components, and their attributes, locations and interconnections, to the controller.

4 Claims, 48 Drawing Sheets

Home Entertainment Control System Controller

U.S. PATENT DOCUMENTS

| | | | |
|---|---|---|---|
| 5,566,879 A | 10/1996 | Longtin | |
| 5,572,438 A | 11/1996 | Ehlers et al. | |
| 5,579,221 A | 11/1996 | Mun | |
| 5,621,662 A | 4/1997 | Humphries et al. | |
| 5,640,143 A | 6/1997 | Myron | |
| 5,668,446 A | 9/1997 | Baker | |
| 5,751,965 A | 5/1998 | Mayo | |
| 5,814,902 A | 9/1998 | Creasy et al. | |
| 5,815,086 A | 9/1998 | Ivie et al. | |
| 5,832,283 A | 11/1998 | Chou et al. | |
| 5,901,246 A | 5/1999 | Hoffberg et al. | |
| 5,905,882 A | 5/1999 | Sakagami et al. | |
| 5,924,486 A | 7/1999 | Ehlers et al. | |
| 5,929,748 A | 7/1999 | Odinak | |
| 5,938,757 A | 8/1999 | Bertsch | |
| 5,946,209 A | 8/1999 | Eckel et al. | |
| 5,956,025 A * | 9/1999 | Goulden et al. | 715/716 |
| 5,962,989 A | 10/1999 | Baker | |
| 5,971,597 A | 10/1999 | Baldwin et al. | |
| 5,973,594 A | 10/1999 | Baldwin et al. | |
| 6,003,131 A | 12/1999 | Lee et al. | |
| 6,021,324 A | 2/2000 | Sizer et al. | |
| 6,029,092 A | 2/2000 | Stein | |
| 6,091,320 A | 7/2000 | Odinak | |
| 6,182,094 B1 * | 1/2001 | Humpleman et al. | 715/513 |
| 6,192,282 B1 | 2/2001 | Smith et al. | |
| 6,199,136 B1 | 3/2001 | Shteyn | |
| 6,211,870 B1 | 4/2001 | Foster | |
| 6,263,260 B1 | 7/2001 | Bodmer et al. | |
| 6,288,716 B1 | 9/2001 | Humpleman | |
| 6,359,636 B1 * | 3/2002 | Schindler et al. | 715/846 |
| 6,378,000 B1 | 4/2002 | Akatsu et al. | |
| 6,385,495 B1 | 5/2002 | Bennett | |
| 6,405,103 B1 * | 6/2002 | Ryan et al. | 700/275 |
| 6,442,440 B1 * | 8/2002 | Miller | 700/83 |
| 6,459,938 B1 | 10/2002 | Ito et al. | |
| 6,473,661 B1 | 10/2002 | Wollner | |
| 6,496,862 B1 | 12/2002 | Akatsu et al. | |
| 6,505,087 B1 | 1/2003 | Lucas et al. | |
| 6,535,110 B1 | 3/2003 | Arora et al. | |
| 6,626,586 B1 * | 9/2003 | Jaeger | 398/5 |
| 6,930,730 B2 * | 8/2005 | Maxon et al. | 348/734 |
| 2001/0034754 A1 | 10/2001 | Elwahab | |
| 2002/0091812 A1 * | 7/2002 | Ando et al. | 709/223 |
| 2002/0147561 A1 * | 10/2002 | Baracat et al. | 702/119 |
| 2003/0023411 A1 * | 1/2003 | Witmer et al. | 703/1 |
| 2003/0093161 A1 * | 5/2003 | Gauthier et al. | 700/39 |
| 2003/0107674 A1 * | 6/2003 | Creed et al. | 348/552 |

FOREIGN PATENT DOCUMENTS

| WO | WO 97/44720 | 11/1997 |
|---|---|---|

OTHER PUBLICATIONS

U.S. Appl. No. 09/693,530, filed Oct. 19, 2000, Bilger.
U.S. Appl. No. 09/693,468, filed Oct. 19, 2000, Bilger.
U.S. Appl. No. 09/693,370, filed Oct. 19, 2000, Bilger.
Paul Davidsson, et al., "Multi-Agent System For Controlling Intelligent Buildings", Proceedings of the Fourth International Conference on Multi-Agent Systems, Jul. 2000, pp. 377-378.
Paul Davidsson, "Intelligent Buildings: Energy Saving and Value Added Services", no date, pp. 107-121.
Magnus Boman et al., "Energy Saving and Added Customer Value In Intelligent Buildings", Proceedings of the Third International Conference on Practical Application of Intelligent Agents and Multi-Agent Technology, 1998, pp. 505-517.
Yi-Min Wang et al., "Towards Dependable Home Network: An Experience Report", Apr. 18, 2000, Technical Report, Microsoft Research Microsoft Corporation.

* cited by examiner

DDW Make and Model

DDW Input Connector Groups

DDW Assignable Input Ports

DDW IR Edit

Design Module Adding a VCR to the Family Room

Design Module Adding a DVD to the Family Room

Design Module Adding a Satellite Receiver to the Family Room

Design Module Adding a Surround Receiver to the Family Room

Design Module with All of the AV Components Added

Entertainment Devices in FamilyRoom

FamilyRoom

| Done | Component | Video In | Video Out | Audio In | Audio Out | Power | Control |
|------|-----------|----------|-----------|----------|-----------|-------|---------|
| ☐ | FamilyRoom VCR | 0 | 0 | 0 | 0 | 0 | 0 |
| ☐ | FamilyRoom DVD | 0 | 0 | 0 | 0 | 0 | 0 |
| ☐ | FamilyRoom Satellite | 0 | 0 | 0 | 0 | 0 | 0 |
| ☐ | FamilyRoom PVR | 0 | 0 | 0 | 0 | 0 | 0 |
| ☐ | FamilyRoom AV Surround r... | | | | | | |
| ☐ | FamilyRoom TV | 0 | 0 | 0 | 0 | 0 | 0 |

[Add Component]

*Click a Component Name to Edit/Delete that Component*
*Or Click the Add Component Button Above to Add a New Component in this Room*

Figure 29

Design Module Info and Help

| Edit FamilyRoom DVD | | | ☒ |
|---|---|---|---|
| Connections for FamilyRoom DVD | | | |

A/V In | A/V Out | Control,Status,Power,Other | Info and Help

Name: FamilyRoom DVD     On Line Manual: _____

Display Name: DVD
*Maximum eight characters*

Mfg: RCA     Model: RC6001P plus

XML_File : RCA-RC6001P plus.xml

Serial #: 123456789     Date of Installation: 1/14/03

Warrantee period: 12    *in months*

Dimensions
0.0 h   0.0 w   0.0 d

Power Dissipation in Watts
Active: 120     Standby: 20

Update        Ok   Cancel   Delete

Figure 33

Design Module All AV Components with Wires

Entertainment Devices in FamilyRoom

FamilyRoom

| Done | Component | Video In | Video Out | Audio In | Audio Out | Power | Control |
|---|---|---|---|---|---|---|---|
| ☐ | FamilyRoom VCR | 0 | 1 | 0 | 1 | 0 | 0 |
| ☐ | FamilyRoom DVD | 0 | 2 | 0 | 1 | 0 | 1 |
| ☐ | FamilyRoom Satellite | 0 | 1 | 0 | 1 | 0 | 1 |
| ☐ | FamilyRoom PVR | 1 | 0 | 1 | 0 | 0 | 1 |
| ☐ | FamilyRoom AV Surround r... | 3 | 1 | 2 | 1 | 0 | 1 |
| ☐ | FamilyRoom TV | 1 | 0 | 1 | 0 | 0 | 1 |

Add Component

*Click a Component Name to Edit/Delete that Component*
*Or Click the Add Component Button Above to Add a New Component in this Room*

HOME ENTERTAINMENT SYSTEM AND METHOD

This application claims the benefit of U.S. Provisional Application No. 60/414,234, filed Sep. 26, 2002.

FIELD OF THE INVENTION

The present invention relates to home entertainment control, and more particularly to a home entertainment control system and method that enables automatic control of entertainment components in a home or business.

BACKGROUND OF THE INVENTION

Today a homeowner that has a theater consisting of multiple entertainment components in a single room and/or a distributed audio system consisting of multiple entertainment components distributed through the house has 3 choices on how to control it: 1) use multiple individual remote controllers, 2) program and use a programmable remote controller, or 3) write a custom program for a touch screen display. Each of these methods has multiple problems. In addition, today, documentation and testing of entertainment systems are poorly implemented and very time consuming.

Many homeowners today have theater systems with at least the following components:
1. VCR player,
2. DVD player,
3. Satellite or Cable receiver,
4. Personal Video Recorder,
5. Surround sound receiver, and a
6. Television or projector or plasma display.

For this rather typical system, the homeowner now has six remote controllers—one for each of the above systems. Furthermore, some theater systems add:
7. Video processor,
8. CD jukebox,
9. Digital music player,
10. drop down screen,
11. remote controlled lighting, and
12. remote controlled window treatments This set of additional components and devices requires even more remote controllers.

For the homeowner, just changing the channel requires finding the right controller and remembering which button to press, but turning the system on and off is much more difficult in that multiple devices need to be controlled in order to watch a particular AV source such as the DVD player. For example, in order to watch a DVD, the following commands must be executed:
1. Turn on the DVD player
2. Make sure the DVD player did turn on and then wait until it is powered up
3. Play the DVD
4. Turn on the Surround sound receiver
5. Make sure the Surround sound receiver did turn on and then wait until it is powered up
6. On the Surround sound receiver select the DVD input
7. Turn on the TV
8. Make sure the TV did turn on and then wait until it is powered up
9. Select the appropriate input and/or channel on the TV Obviously, this situation is very complex for even the most knowledgeable users, and nearly impossible for any-one who hasn't been trained on how to use that particular theater system. Therefore, homeowners have tried two other methods to reduce the complexity of controlling their home theaters: programmable remote controllers and custom programs.

Today, there are a large number of programmable remote controllers on the market. With these remote controllers, the homeowner enters various codes into the remote controller and/or learns the IR codes directly from the existing remote controller that came with the audio/video component to be controlled so that the programmable remote controller can control each of the AV components above. The result is a single remote controller that can control some number of functions of each AV component when the remote control is pointed at that component.

The programmable remote controller can greatly reduce the number of controllers needed to control many operations of the home theater. However, it doesn't reduce the complexity. The homeowner, still needs to fully understand the whole system and how each component is interconnected with other components in order to turn the right components on and off at the appropriate times, and the homeowner must push additional buttons on the programmable remote controller to tell the programmable remote controller which AV component to control for each step of the process.

To try to reduce this last problem, many programmable remote controllers execute "macros". A macro is a group of commands that are executed together as a result of pushing one button on the programmable remote controller. Each macro must be programmed into the programmable remote controller one step at a time. This process and the end result still have many problems. First, programming the programmable remote controller takes a lot of trial and error to get the wait times correct. Second, the homeowner either ends up with more macros than he can assign to buttons that can be easily documented or he ends up with so few that important functions are left out. And, when using the macro, the user will often have to point the programmable remote controller in multiple directions (at each audio/video component) in sync with the execution of the macro because the IR beam that emits from the programmable remote controller is highly directional and must be pointing at the AV component to be controlled while the commands for that AV component are being emitted. More over, if one of the AV components gets out of sync then the homeowner must revert back to fully comprehending the exact state that each component must be in and then use the individual commands to recreate that state.

For many of these reasons, some homeowners have turned to custom programmed graphical user interfaces from vendors such as AMX and Crestron. The custom programmed graphical user interface can be programmed such that pushing a single well-labeled button on a touch screen display will execute the correct set of commands in the correct order. In addition, with some of these systems, the "power status" (i.e., whether the power of the component is on or off) of each AV component can be obtained by the program through the use of some additional hardware. Therefore, the programmer of a custom programmed graphical user interface can maintain synchronization of all of the AV components.

However, custom programmed graphical user interfaces suffer from a number of problems as well. First, these systems are expensive because each system needs to be individually programmed by a programmer who not only must know about software programming, but who also must know a lot about audio/video systems. Second, these systems may have a number of bugs in them in that this is a custom program that is generally not tested very well. Third, every time a new AV component is introduced in the market, a new program must be created for that component. Fourth, in addition to programming the behavior of the new AV component, every system that uses that component must have its program modified, as well. And, finally, the program to control the entertainment system is only part of the solution. Documentation and testing of the interconnection of all AV components is also needed, and, again, this documentation must be updated, and the testing procedure must be developed, with every new component that is added.

In addition to a theater as described above, many homeowners also want to distribute audio and video sources to multiple rooms of the house. In each room, the homeowner would then like to control which AV source is playing, the selection that is playing on that AV source, and other operations such as volume, balance, bass, treble, etc. This implies that multiple rooms in the house now have the same issues as the theater room described above. Taking this one step further, with distributed audio video systems it is usually possible for different users to try to use some or all of the audio/video path from one or more sources to one or more speakers or video displays. For example, one person may be in the kitchen watching a DVD player located in the family room when another person in the living room wants to watch the satellite receiver that is also located in the family room. It may be the case that these two sources try to travel over part of the same path in which case selecting one path may block the other path. These complex path problems are common in high end audio video systems.

SUMMARY OF THE INVENTION

The present invention solves the aforementioned problems by providing a superior home entertainment controller system and method that better matches the needs and abilities of those wishing to control entertainment in their homes.

The home entertainment control system of the present invention is for a home having a plurality of rooms containing sets of speakers and/or video displays. The system includes a plurality of controlled audio/video components, a plurality of controlled non-audio/video devices, a controller for controlling the controlled audio/video components and non-audio/video devices, all controlled in response to a plurality of user interfaces (e.g. the pushing of a button on a keypad or handheld remote controller, the touching of a touch screen display, the speaking of words, the time of day, and the entrance of someone into the room in which a plurality of sets of speakers and/or video displays are located). The system also includes a configurable software application and related hardware, which capture the behavior and control codes of all audio/video components, and which select the specific components and devices that exist in each room of the home and the interconnection of wires among them to automatically generate the documentation package and test procedures necessary to locate, install, wire, and test every audio/video component of the system.

The home entertainment control system uses a configurable software application: to define the functionality and control of each individual audio/video component in the system, to specify exactly which audio/video components exist in the house, to describe how those components are interconnected with wires, and to specify what other devices in the house need to be controlled when any part of the entertainment system is controlled. It also uses: an automatic routing protocol to determine the best path for audio and video signals to transit the components, a hardware feedback mechanism to continuously monitor the on/off status of every component in the system, and additional algorithms that automatically generate a graphical user interface for a web browser, a push button user interface for keypads and handheld remote controllers, and a complete set of documentation for each installation.

The present invention is a method of operating an entertainment system having a controller that controls a plurality of controllable components in response to a plurality of user interface devices, wherein the controllable components are dispersed among a plurality of locations and are interconnected via interconnections. The method includes identifying to the controller attributes for the controllable components, identifying to the controller locations of the controllable components and interconnections therebetween, wherein the controller generates graphical user interfaces for the user interface devices containing commands for operating the controllable components, and wherein the commands included in the graphical user interfaces of the user interface devices vary based on locations of the user interface devices as well as at least some of the identified controllable component attributes, locations and interconnections, and controlling the controllable components by executing the commands of the graphical user interfaces.

In another aspect of the present invention, an entertainment system includes a plurality of controllable components that are dispersed among a plurality of locations wherein each of the controllable components has attributes associated therewith, a plurality of interconnections between the controllable components, a plurality of user interface devices that are dispersed among at least some of the plurality of locations, and a controller that generates graphical user interfaces for the user interface devices, wherein the graphical user interfaces include commands for operating the controllable components that vary among the graphical user interfaces based on the locations of the user interface devices as well as at least some of the controllable component attributes, locations and interconnections, and wherein the controller controls the plurality of controllable components in response to the graphical user interface commands executed on the user interface devices.

Other objects and features of the present invention will become apparent by a review of the specification, claims and appended figures.

BRIEF DESCRIPTION OF THE DRAWINGS

Figure 5:
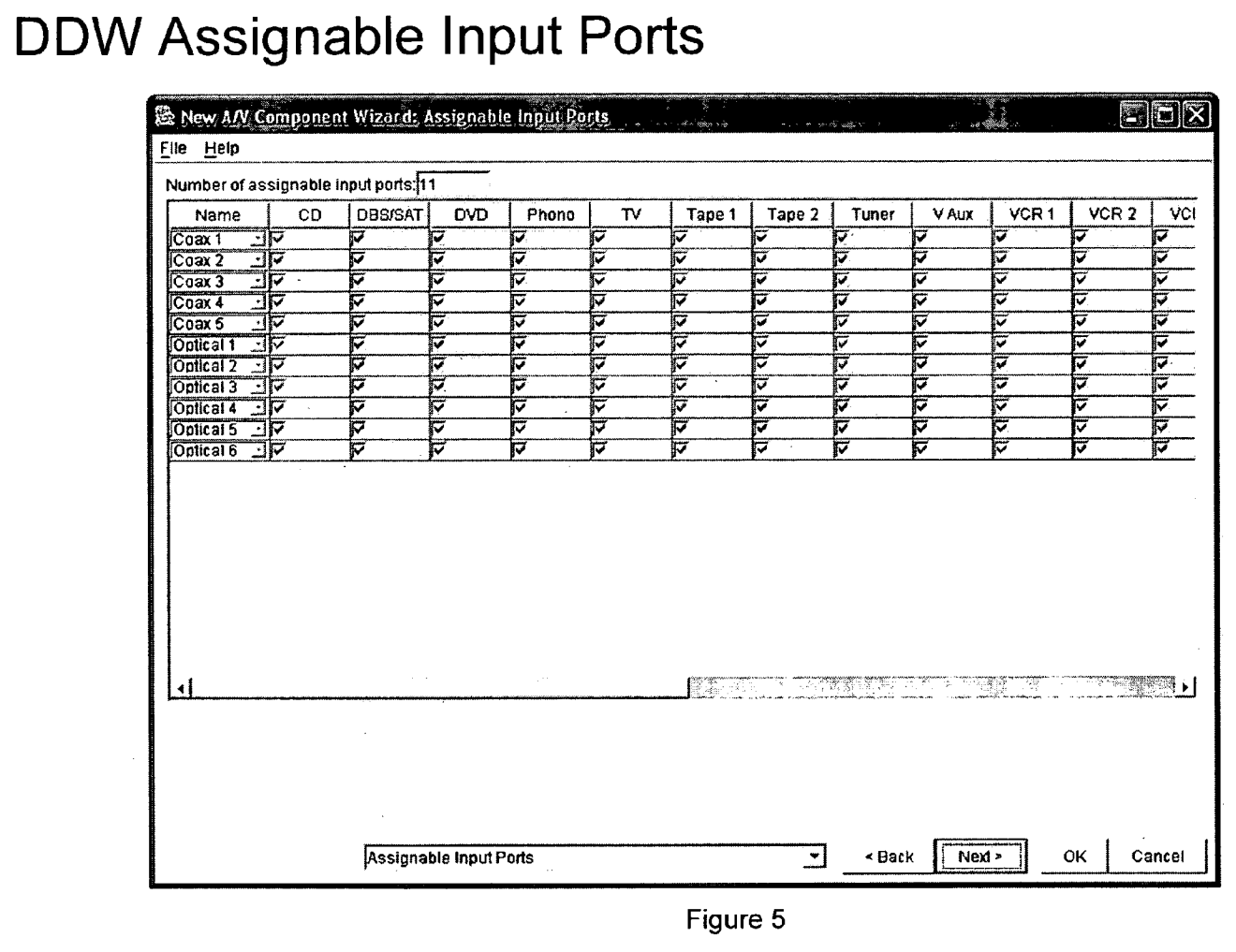

FIG. 5 is a diagram illustrating the Assignable Input Ports menu page of the Device Description Wizard of the present invention.

Figure 6:
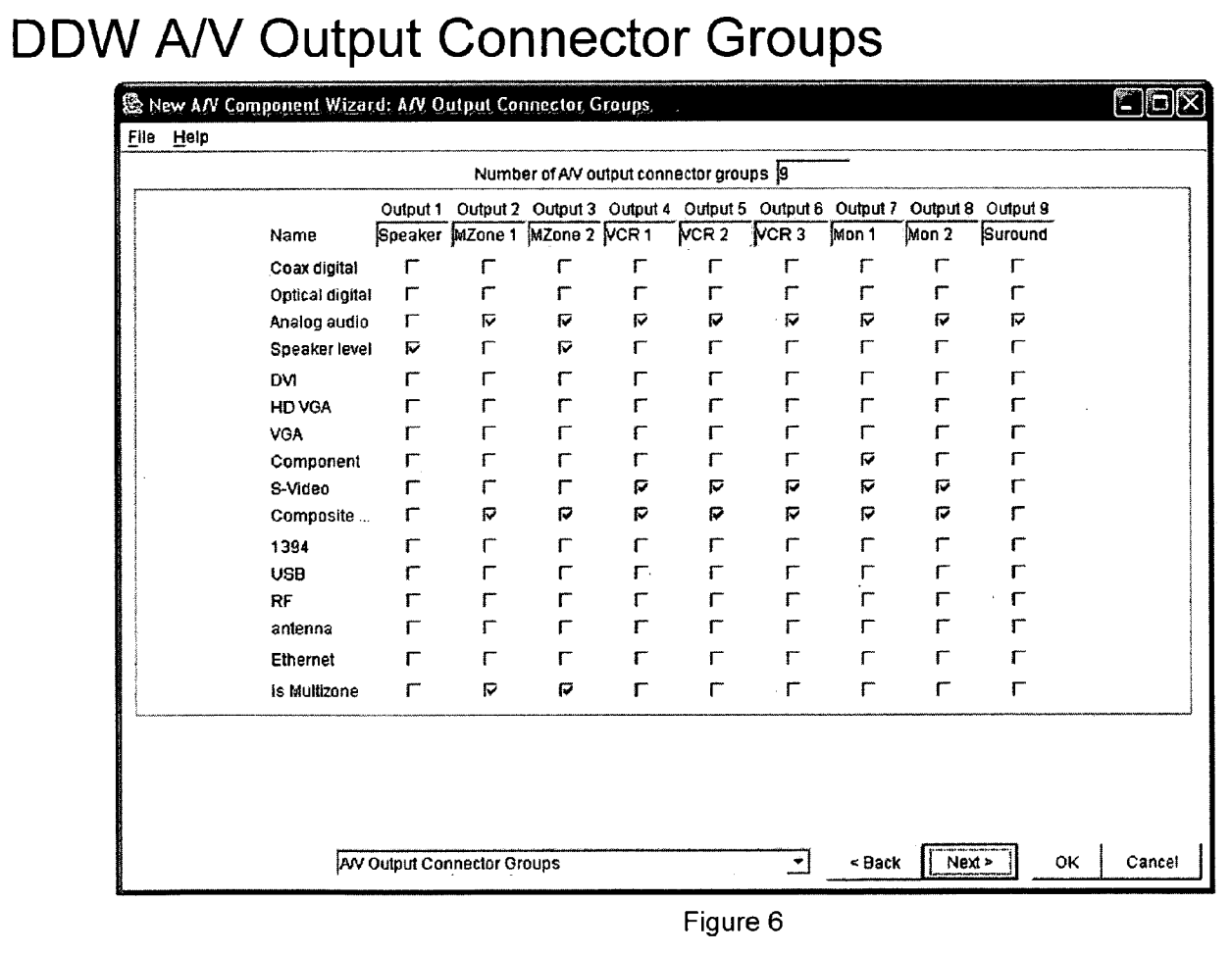

FIG. 6 is a diagram illustrating the AN Output Connector Groups menu page of the Device Description Wizard of the present invention.

FIG. 29 is a diagram illustrating the Design Module list of AV components in the family room menu page of the present invention with all of the AV components added.

FIG. 33 is a diagram illustrating the Design Module Info and Help menu page of the present invention.

FIG. 34 is a diagram illustrating the Design Module All AV Components with Wires menu page of the present invention.

FIG. 39 is a diagram illustrating the Documentation Module Run List menu page of the present invention.

DETAILED DESCRIPTION OF THE PREFERRED EMBODIMENTS

A. Basic System

Figure 1:
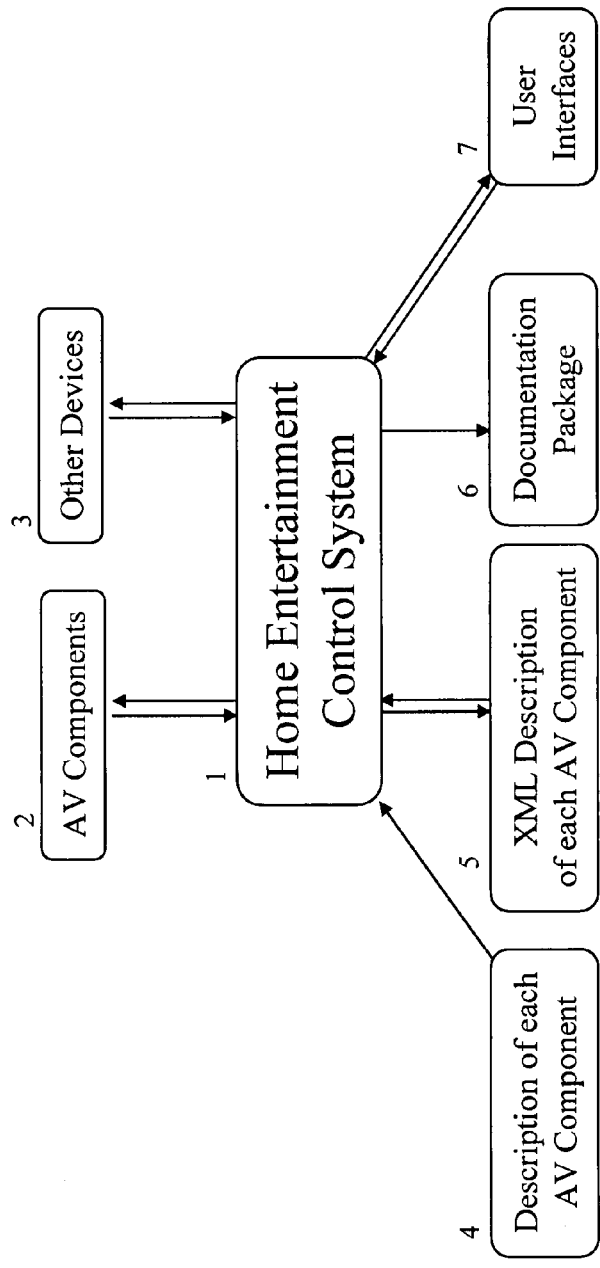
FIG. 1 is a diagram illustrating the major components of the home entertainment control system of the present invention.

The present invention is a home entertainment control system as illustrated in FIG. 1, comprising 7 major components: a Home Entertainment Controller 1, a set of AV Components 2, a set of Other Devices 3, a Description of each AV Component 4, an XML Description of each AV Component 5, a Documentation Package 6, and User Interfaces 7.

The Home Entertainment Controller 1 monitors and controls the AV Components 2 based on the XML Description of each AV Component 5 (which is derived from the Description of each AV Component 4). The Home Entertainment Controller 1 also monitors and controls the Other Devices 3 in the home such as lighting and window treatments. The control of the AV Components 2 and Other Devices 3 is in response to commands received from the User Interfaces 7. In addition, the Home Entertainment Controller 1 generates the Documentation Package 6.

The set of AV Components 2 generate, process, and/or switch audio and/or video information and/or convert the audio and/or video information into sound and/or images. AV (audio-visual) Components 2 include, but are not limited to, AV sources and destinations such as Antennas, Amplifiers, AV surround processors, AV surround receivers, AV switches, CD players and changers, Cable set top boxes, Drop down screens, DVD players and changers, Game consoles, Microphones, MP-3 players, MPEG codecs, Personal computers, Personal video recorders, Plasma displays, Power conditioners, Projectors, Satellite receivers, Speakers, Splitters, Tuners, TVs, VCR players, Video processors, all TCP/IP networking equipment used to carry audio and/or video information, and all combinations of these components.

The set of Other Devices 3 are non-AV components found in the home that can be monitored and/or controlled, such as Appliances, Cameras, Electronic doors and gates, HVAC systems, Fireplaces, Fountains, Irrigation systems, Lights, Phone systems, Security systems, Window treatments and any other device in the home that has more than one state.

The Description of each AV Component 4 includes attributes about a single component that makes it unique, such as name, make, model, component type, the number and type of AV inputs and outputs, the number and type of power inputs and outputs, the number and type of control inputs and outputs and all codes used to control the AV component, the number and type of all knobs and switches and displays, its dimensions, its power dissipation, its AV transfer characteristics, and all other attributes of the AV component that exist in any of: the manual, the marketing material, the software, the hardware, or can be obtained from people familiar with the product. The Description of each AV Component is input into controller 1 by a user or installer.

The XML Description of each AV Component 5 is an attribute data file that includes all of the attributes that exist in the Description of each AV Component 4, but in a known format such as XML. The resultant XML file 5 may be stored in the controller 1, or externally on a personal computer, on a server in the home, or on a server on a network anywhere in the world.

The Documentation Package 6 includes a schematic diagram of all connections to all AV Components 2 and to all Other Devices 3 in the home that are monitored and/or controlled, elevation diagrams of all walls of all rooms that contain AV components with reference points for the location of all AV components in the room, top down views of all rooms that contain AV components with reference points for the location of all AV components in the room, elevation diagrams of all sides of all cabinets in all rooms that contain AV components with a scaled diagram of all AV components in each rack, a parts list of all AV components and wires required to implement the AV system, a run list of the length and location of all wires required to implement the AV system, a set of rules for the automatic routing of the AV wires, a set of rules for the automatic routing of control wires, a set of rules for the automatic routing of power wires, a set of rules for the automatic placement of AV equipment into racks, and a test procedure for testing all paths through the AV system. The Documentation Package 6 may be stored in the controller 1, or externally on a personal computer, on a server in the home, or on a server on a network anywhere in the world.

The plurality of User Interfaces 7 are used to control the AV system, and to determine and/or control the state of the plurality of AV components 2 and Other Devices 3. This would include but is not limited to: hand held remote controls, touch panel displays, keypads, computers, web browsers, voice recognition devices, and any other device that a user can use to send a signal to the controller 1 via a wired or wireless connection. In a typical configuration, a computer user interface is used to install and configure the home entertainment system, and a plurality of hand held infrared remote user interface devices are used to operate the home entertainment system.

B. Home Entertainment Control System

Figure 2:
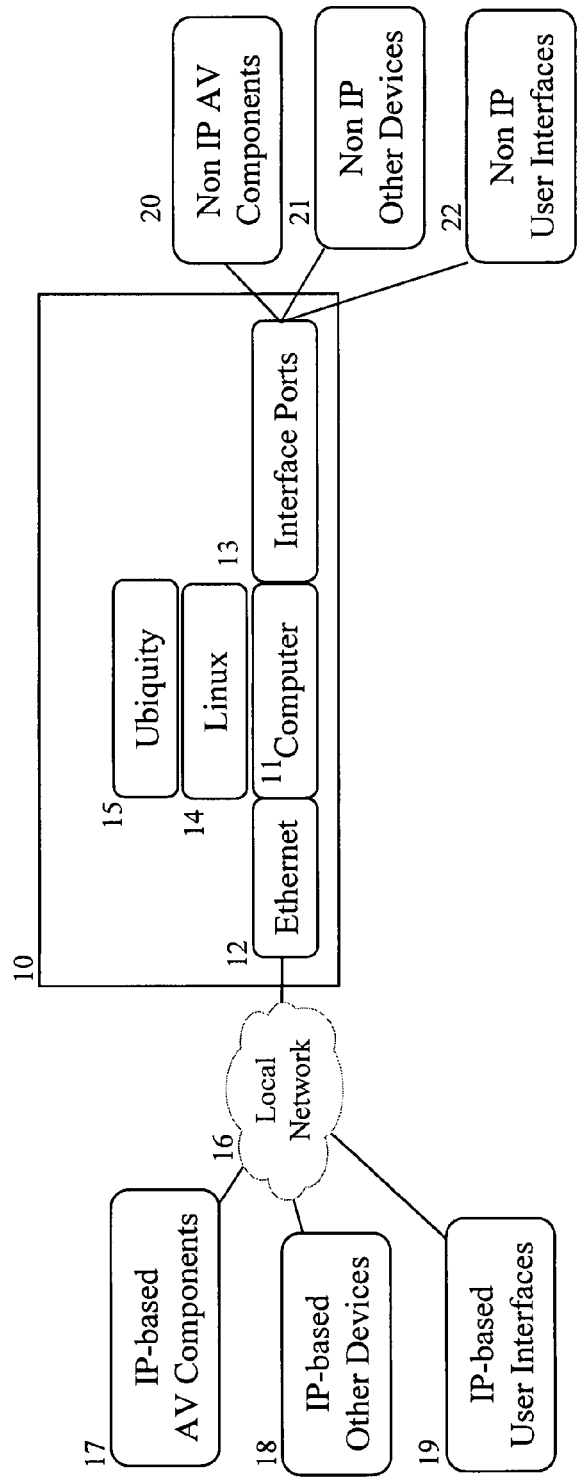
FIG. 2 is a diagram illustrating the major components of the controller of the home entertainment control system of the present invention.

The preferred embodiment of the home entertainment controller 1 is shown in FIG. 2, and includes a computer 11 connected to an Ethernet port 12 and Interface Ports 13. Preferably, a Linux operating system 14 is running on the computer 11, as well as a control program 15 (e.g. a Java-based software application). The Ethernet port 12 connects to a local area network 16 of the home, and from there, to all IP-based AV Components 17, all IP-based Other Devices 18, and all IP-based User Interfaces 19. Similarly, the Interface Ports 13 connect to all Non-IP AP Components 20, Other Devices 21, and User Interfaces 22. In this way, the control program 15 has access to monitor and control all AV Components 2, Other Devices 3, and User Interfaces 7 in the home.

Figure 3:
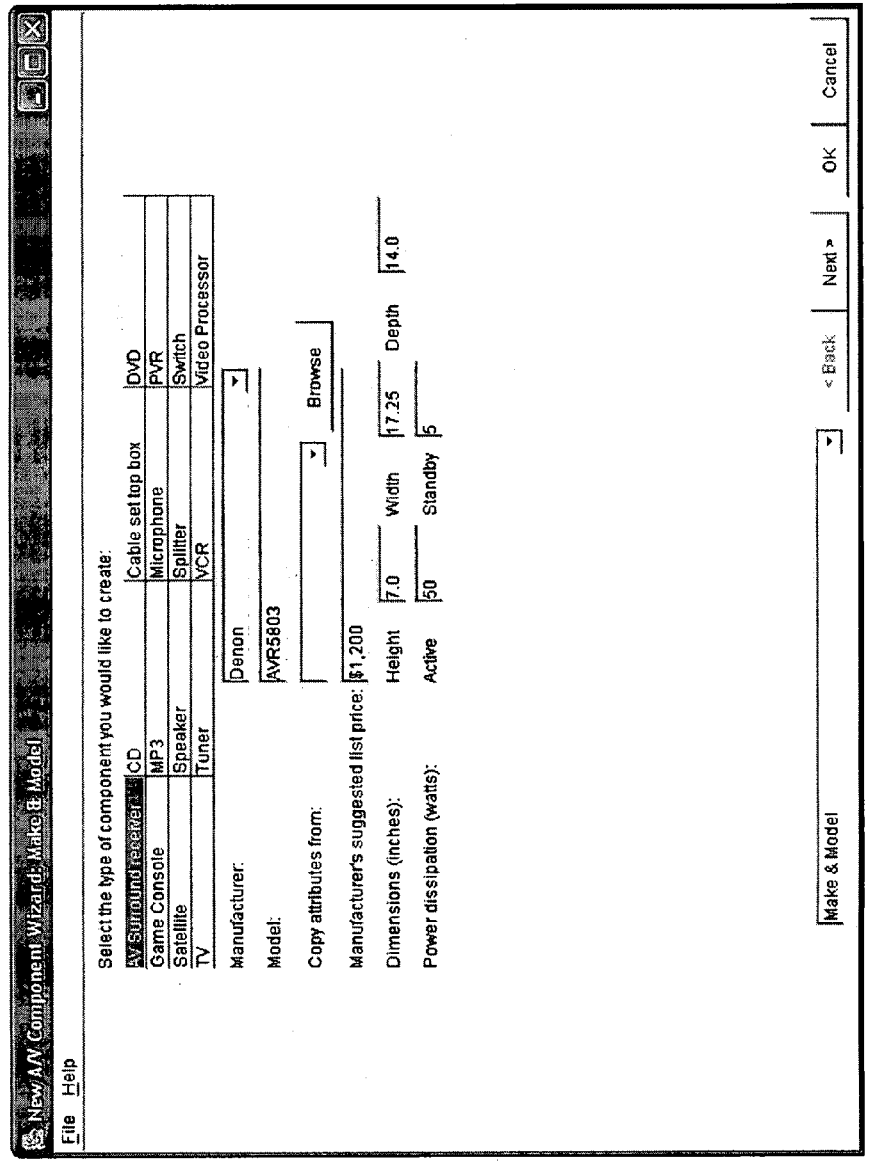
FIG. 3 is a diagram illustrating the Make and Model menu page of the Device Description Wizard of the present invention.
Figure 4:
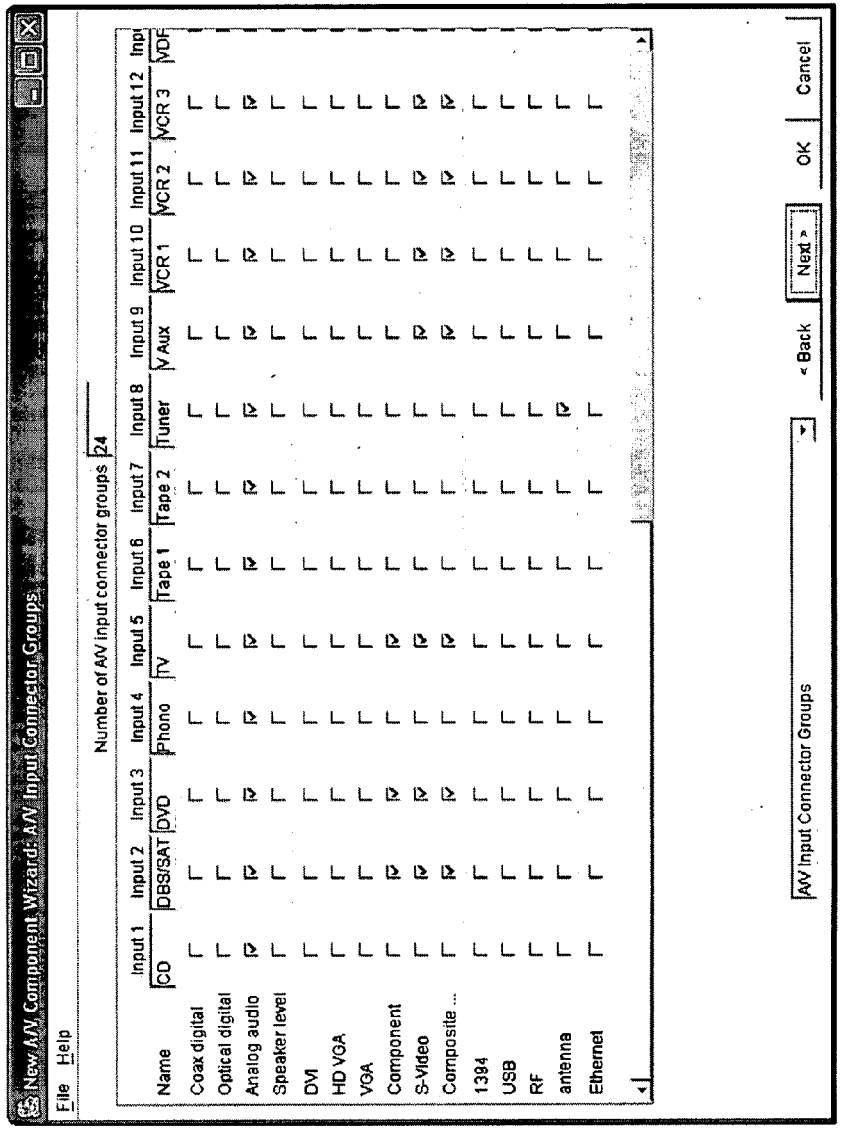
FIG. 4 is a diagram illustrating the Input Connector Groups menu page of the Device Description Wizard of the present invention.
Figure 7:
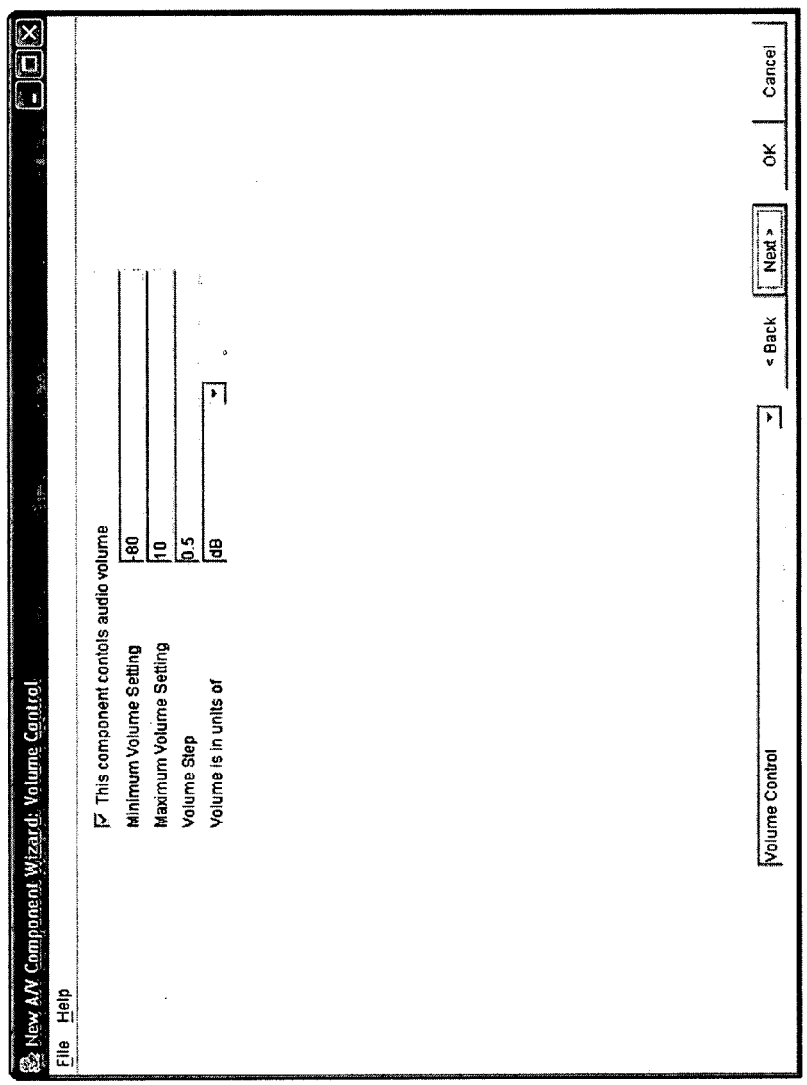
FIG. 7 is a diagram illustrating the Volume Control menu page of the Device Description Wizard of the present invention.
Figure 8:
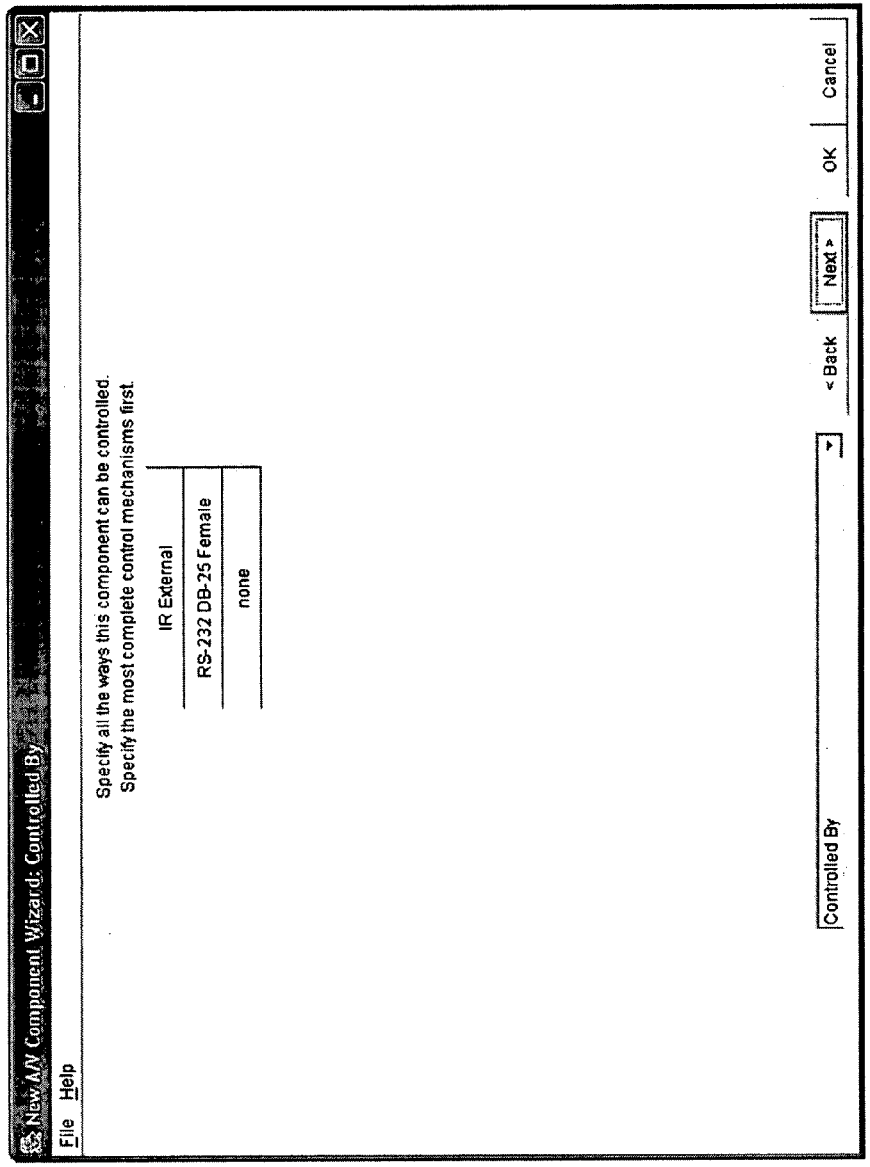
FIG. 8 is a diagram illustrating the Controlled By menu page of the Device Description Wizard of the present invention.
Figure 9:
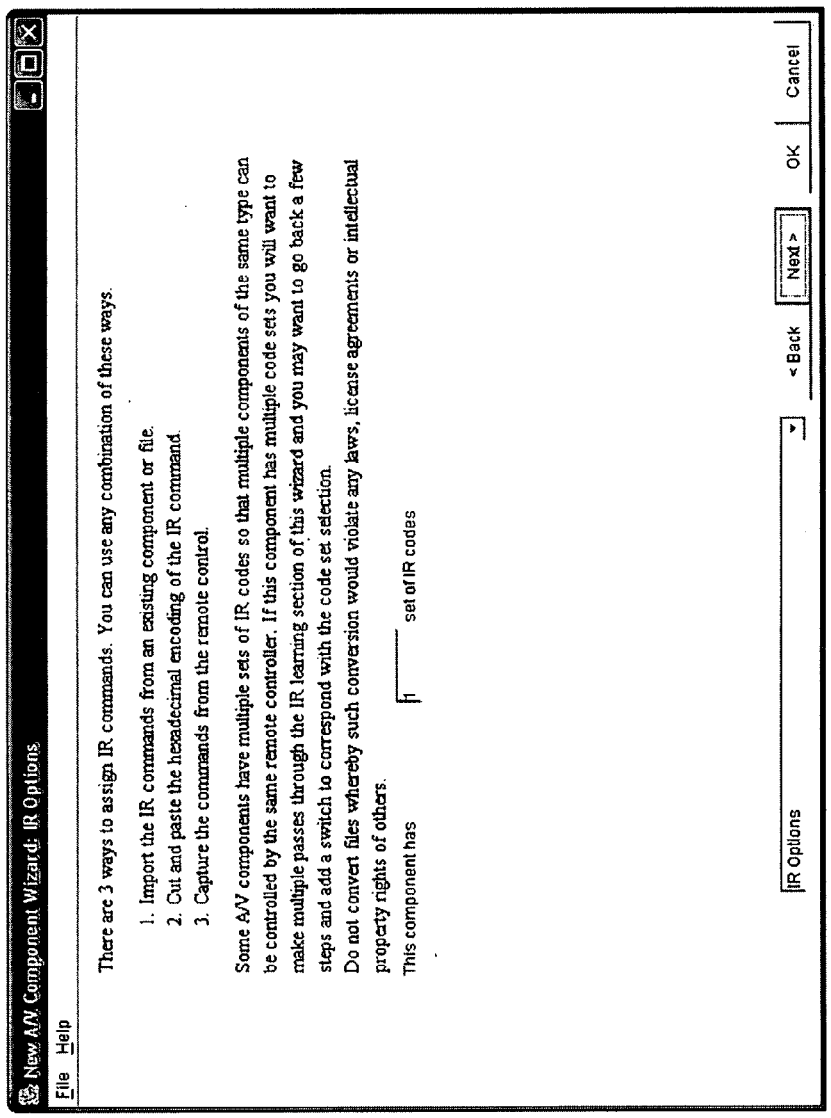
FIG. 9 is a diagram illustrating the IR Options menu page of the Device Description Wizard of the present invention.
Figure 10:
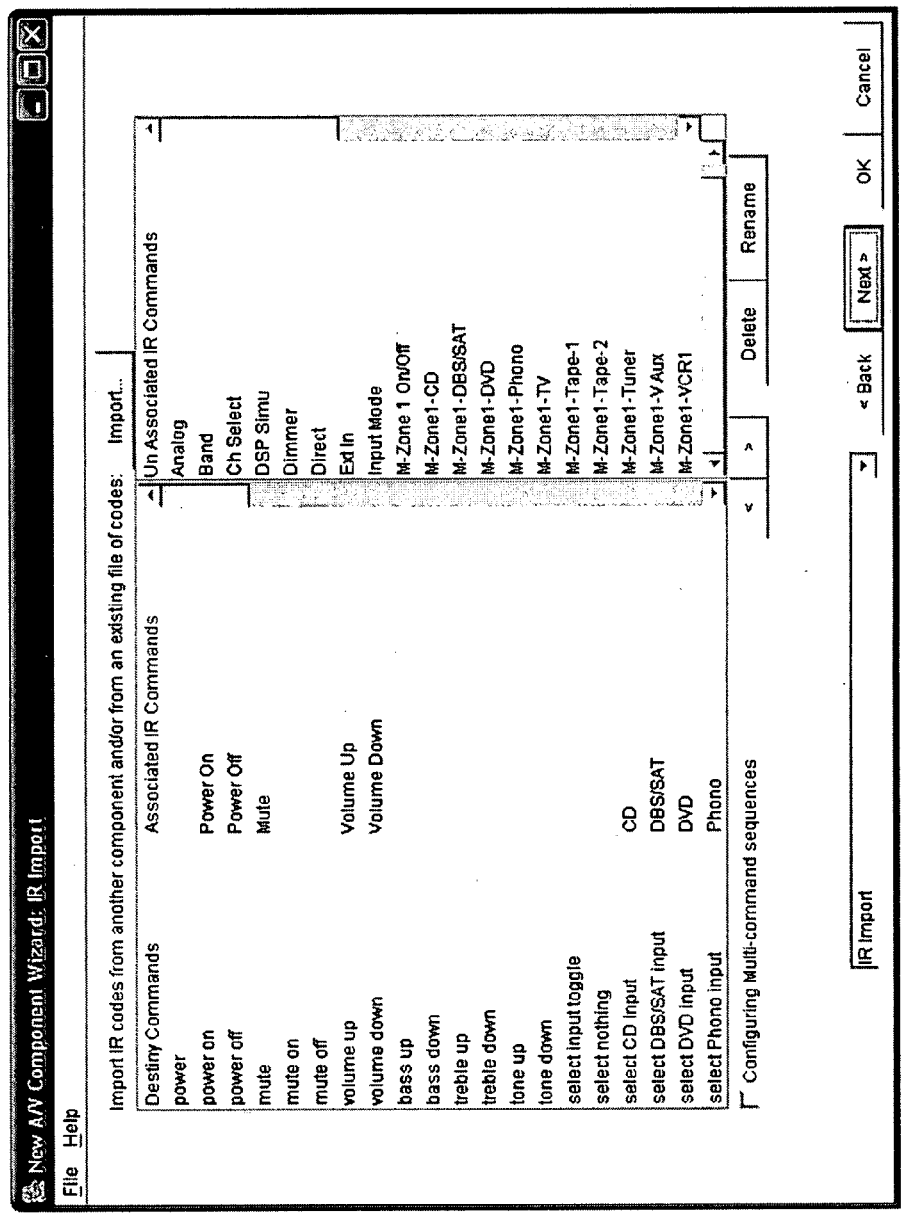
FIG. 10 is a diagram illustrating the IR Import-menu page of the Device Description Wizard of the present invention.
Figure 11:
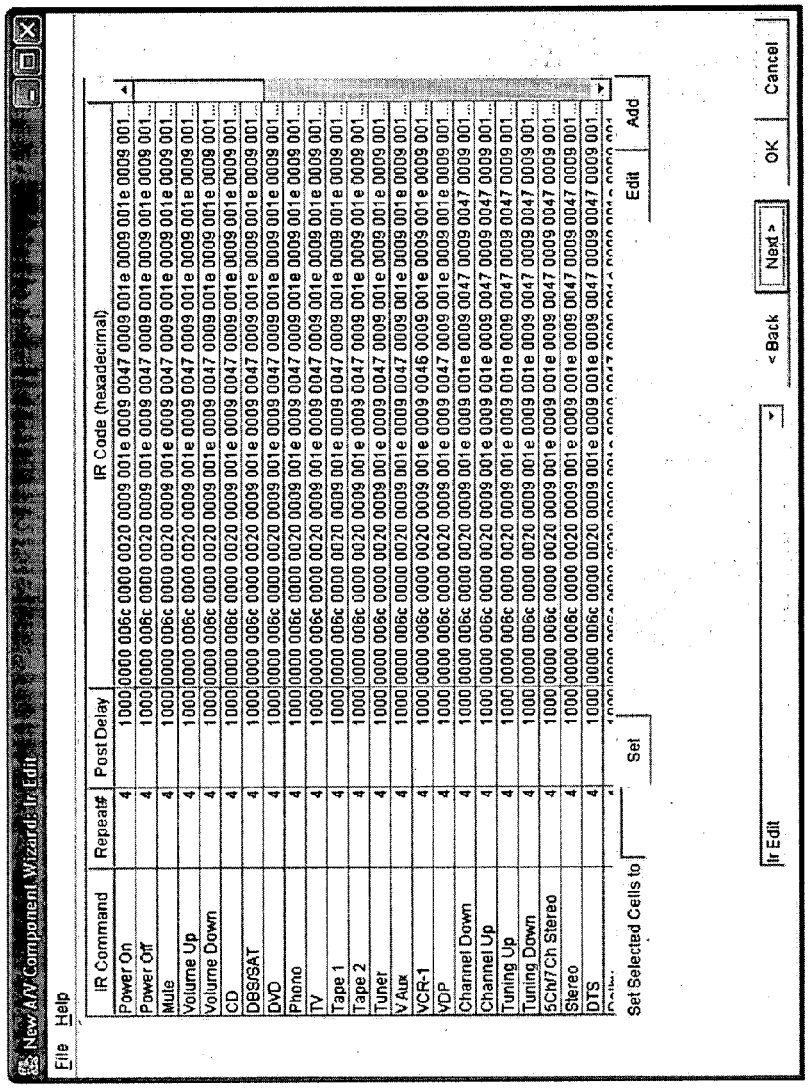
FIG. 11 is a diagram illustrating the IR Edit menu page of the Device Description Wizard of the present invention.
Figure 12:
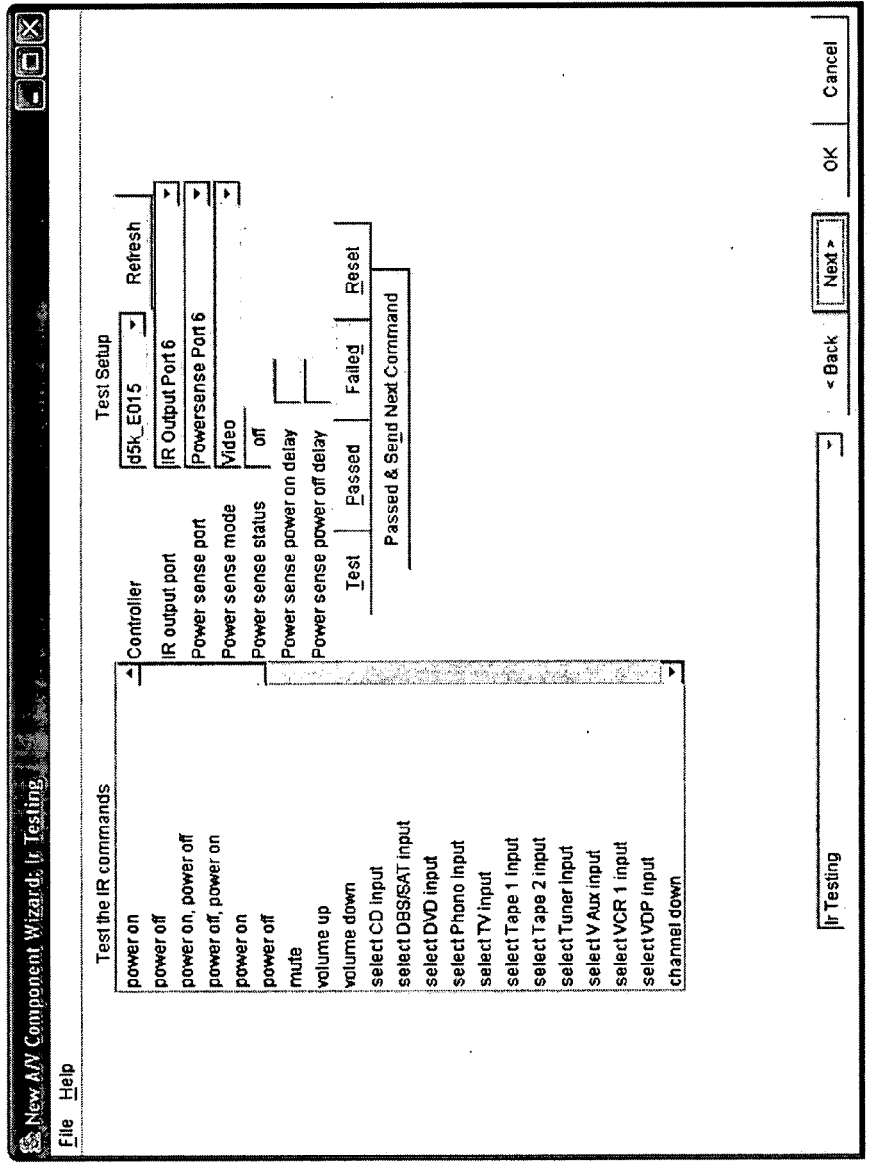
FIG. 12 is a diagram illustrating the IR Testing menu page of the Device Description Wizard of the present invention.
Figure 13:
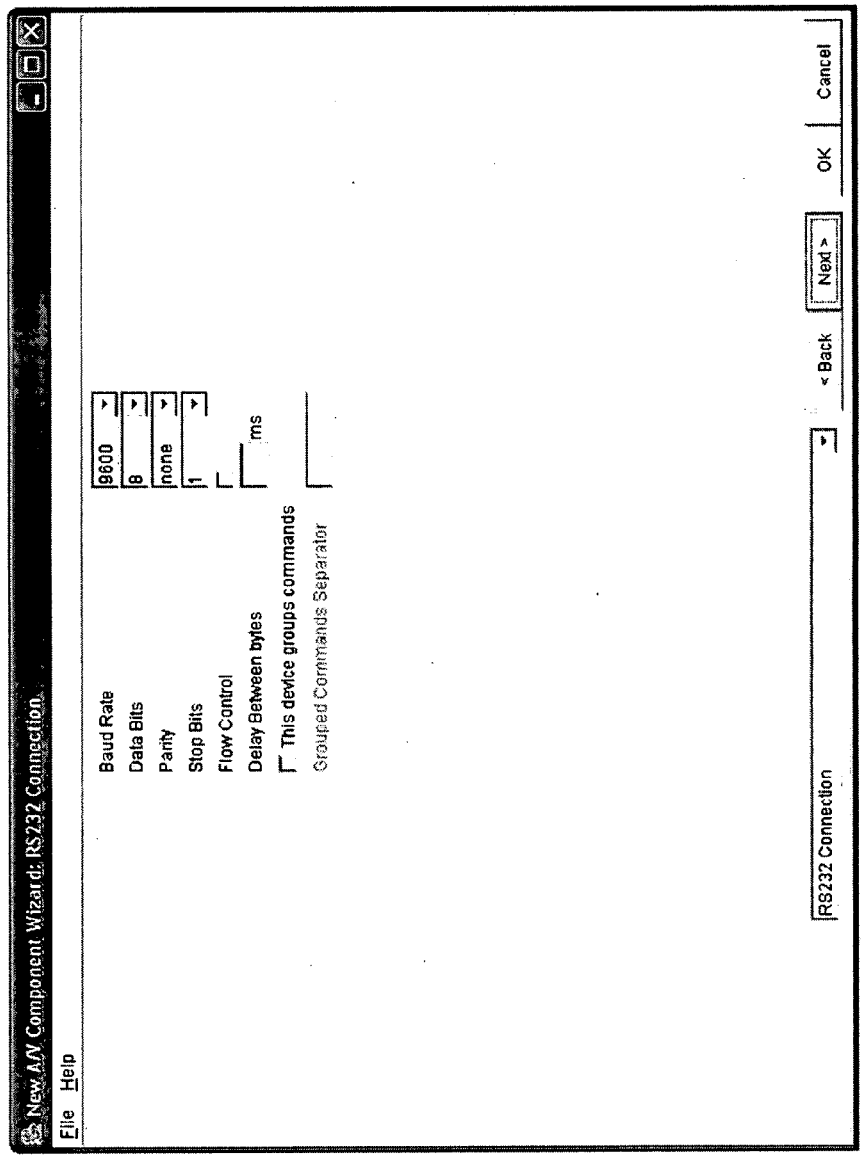
FIG. 13 is a diagram illustrating the RS232 Connection menu page of the Device Description Wizard of the present invention.
Figure 14:
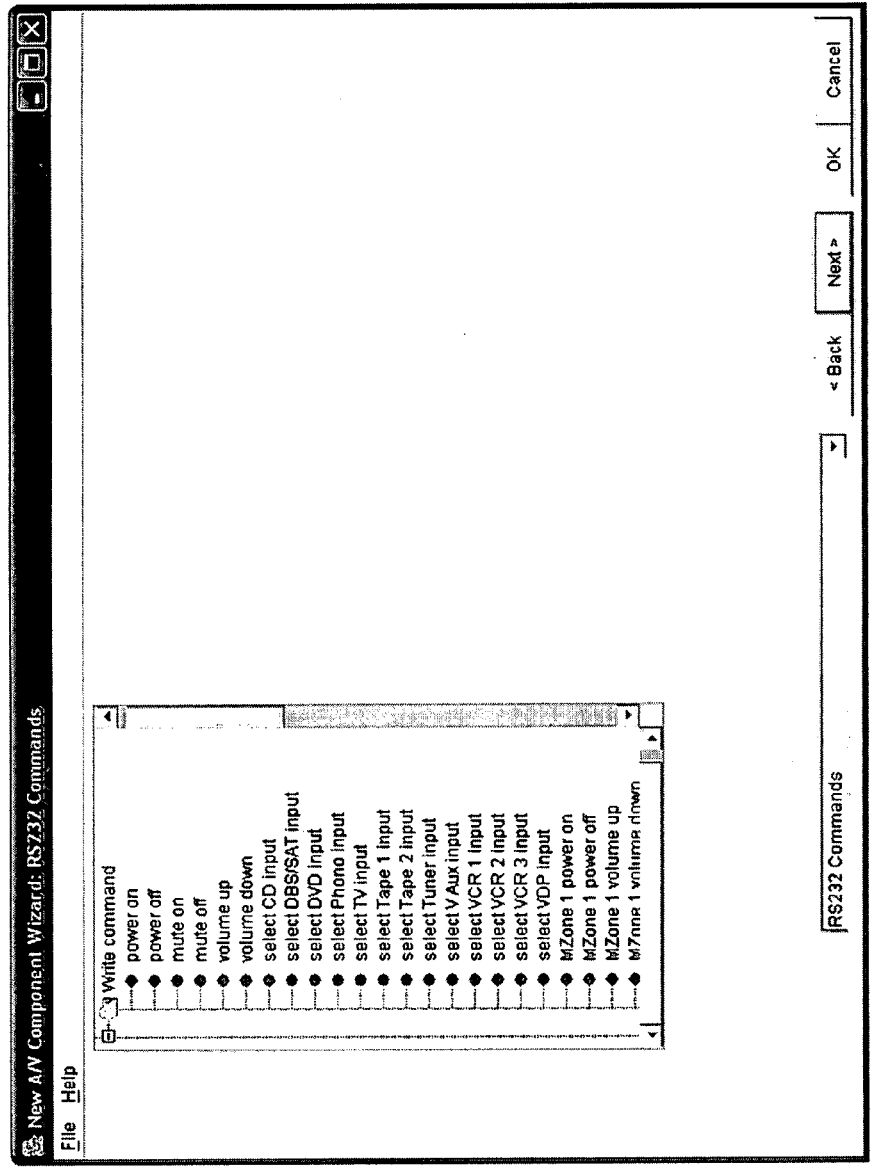
FIG. 14 is a diagram illustrating the RS232 Commands menu page of the Device Description Wizard of the present invention.
Figure 15:
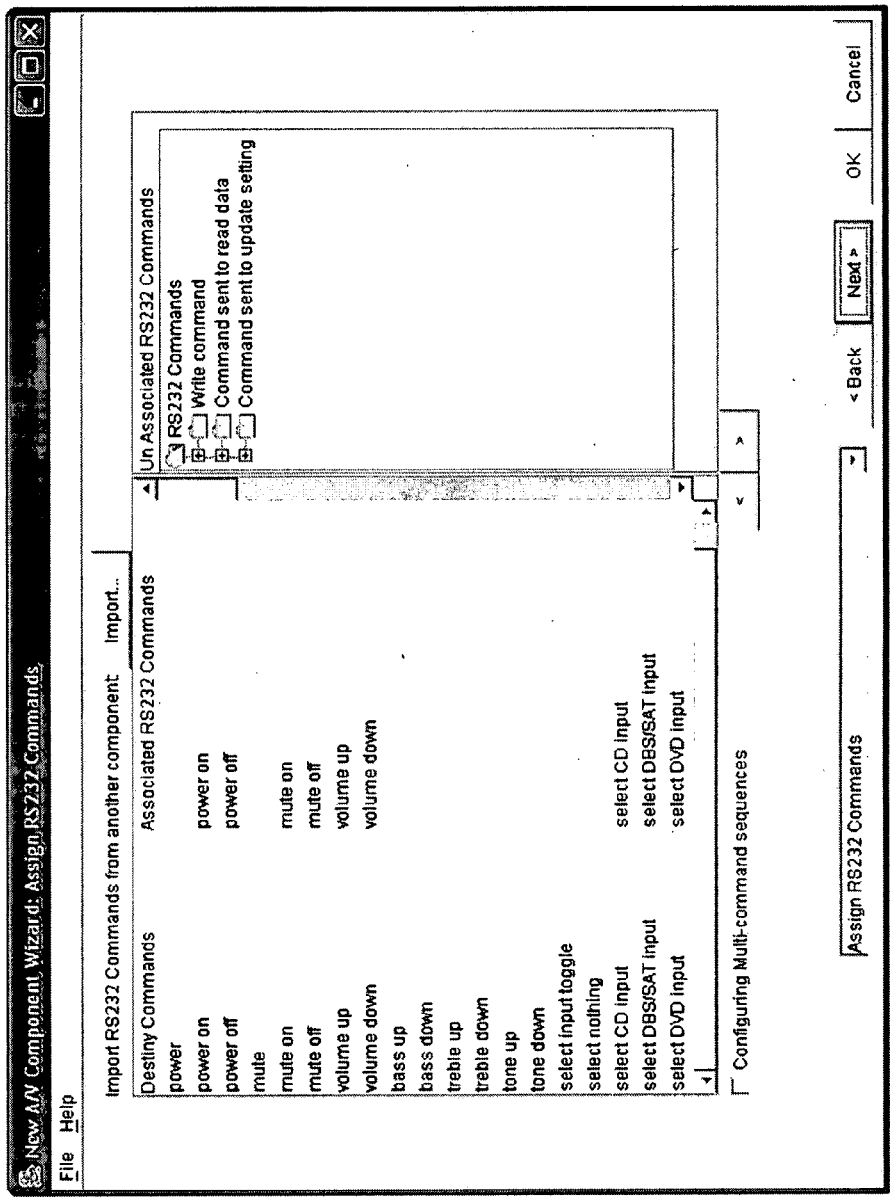
FIG. 15 is a diagram illustrating the Assign RS232 Commands menu page of the Device Description Wizard of the present invention.
Figure 16:
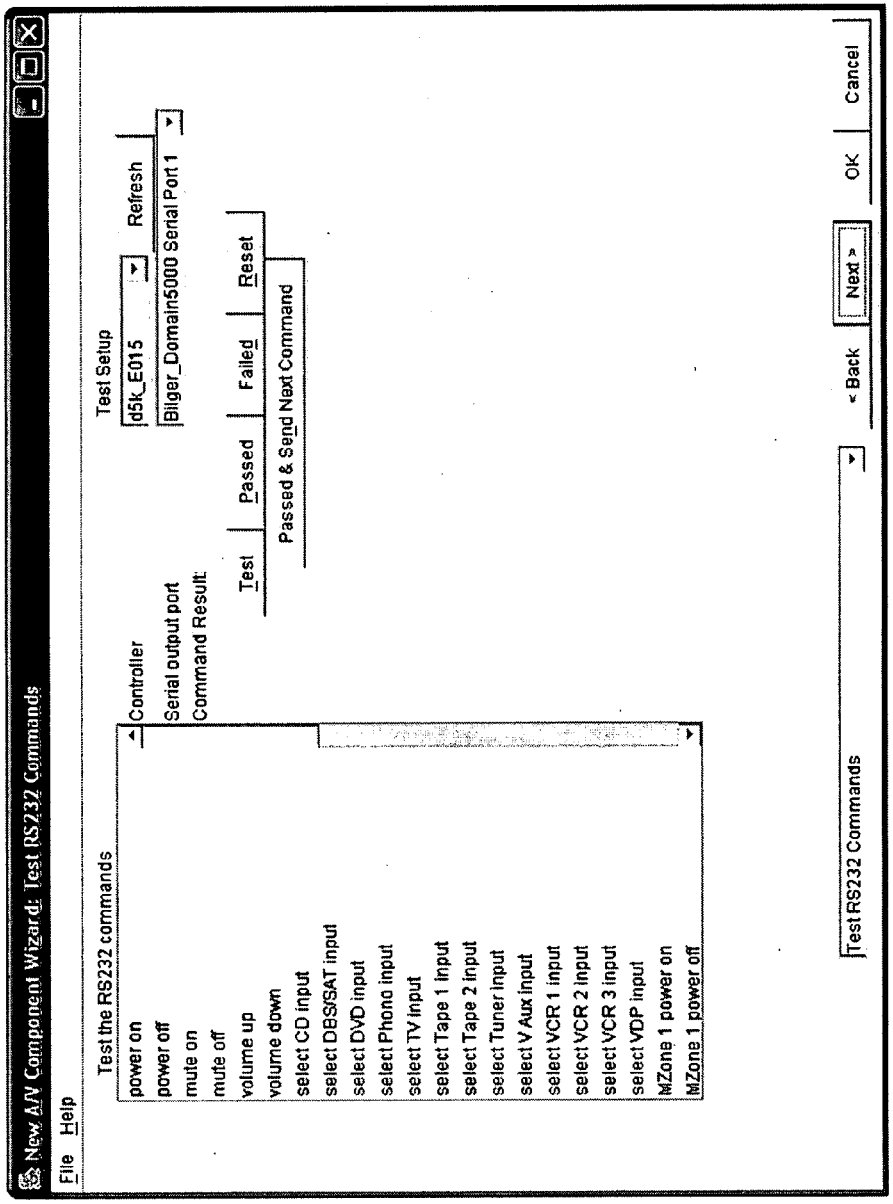
FIG. 16 is a diagram illustrating the Test RS232 Commands menu page of the Device Description Wizard of the present invention.
Figure 17:
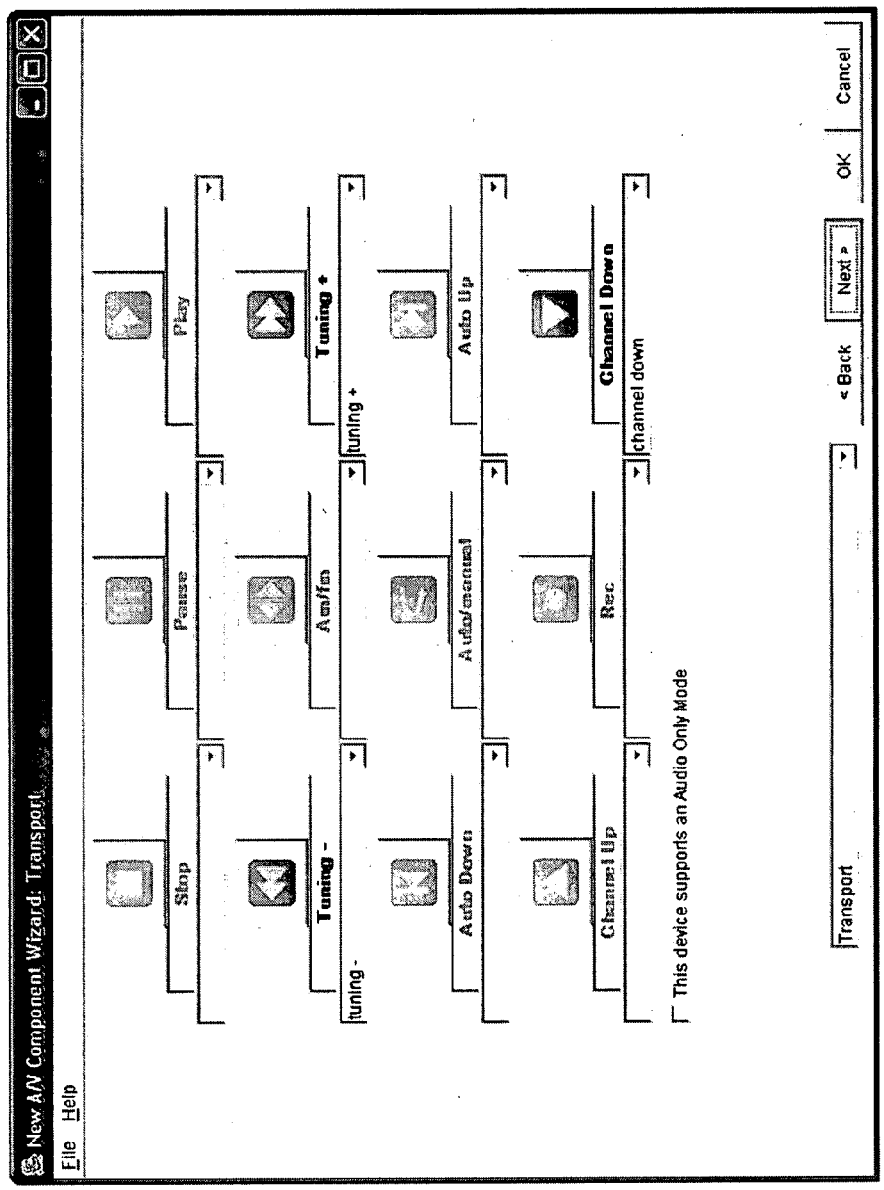
FIG. 17 is a diagram illustrating the Transport menu page of the Device Description Wizard of the present invention.
Figure 18:
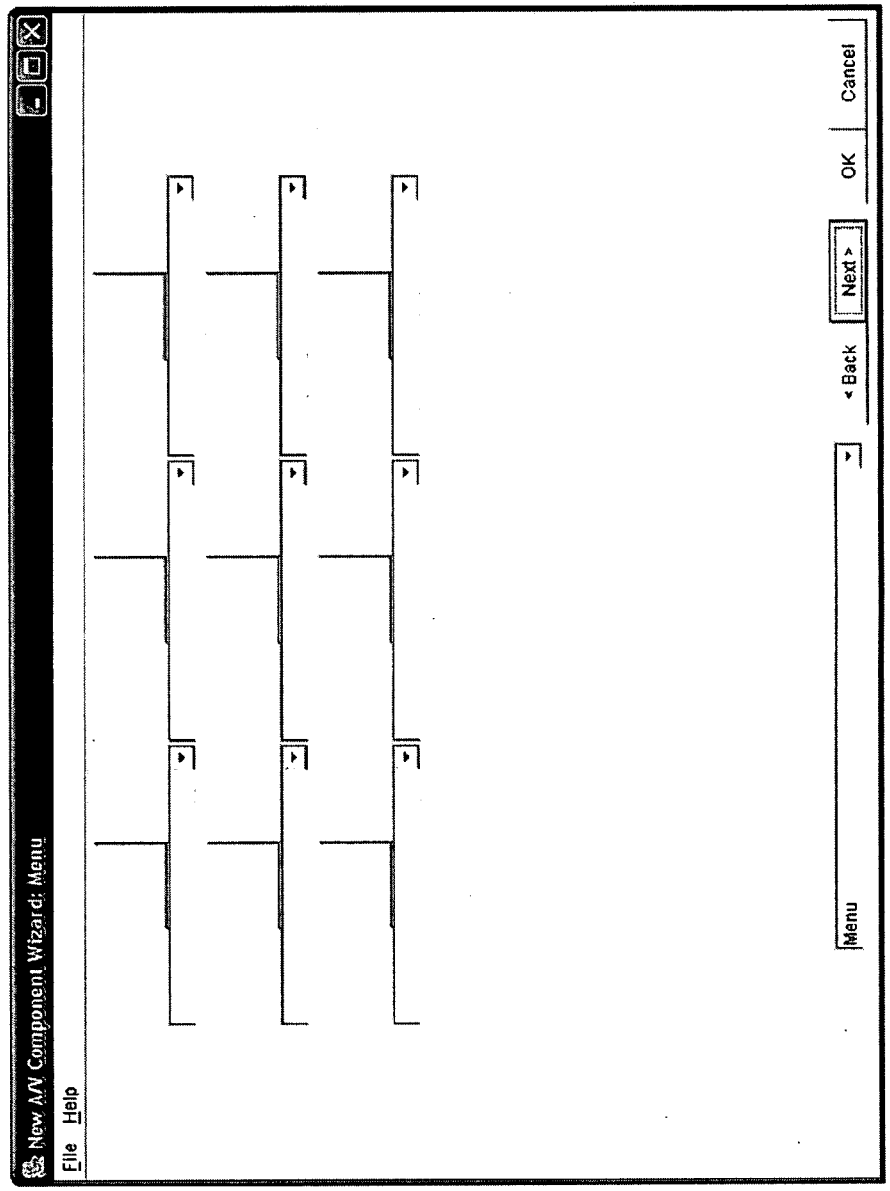
FIG. 18 is a diagram illustrating the Menu menu page of the Device Description Wizard of the present invention.
Figure 19:
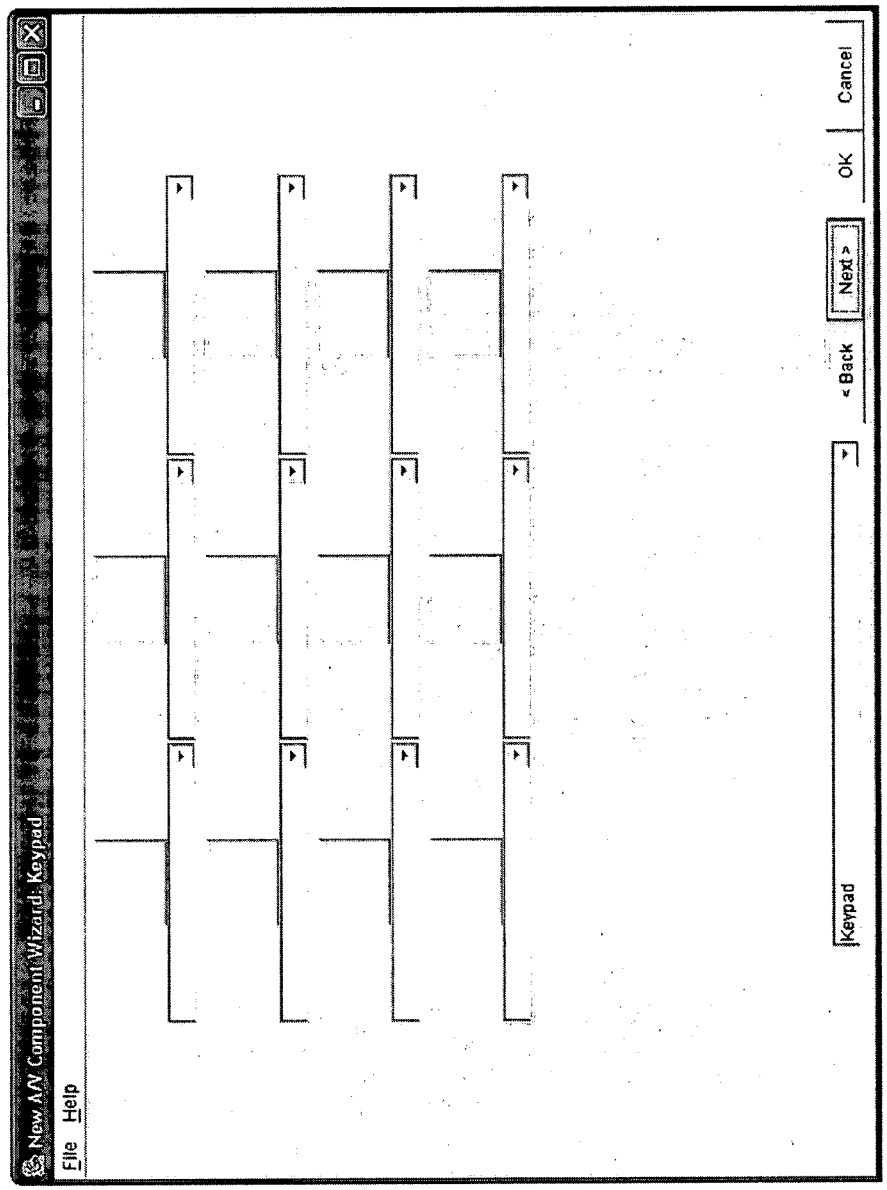
FIG. 19 is a diagram illustrating the Keypad menu page of the Device Description Wizard of the present invention.
Figure 20:
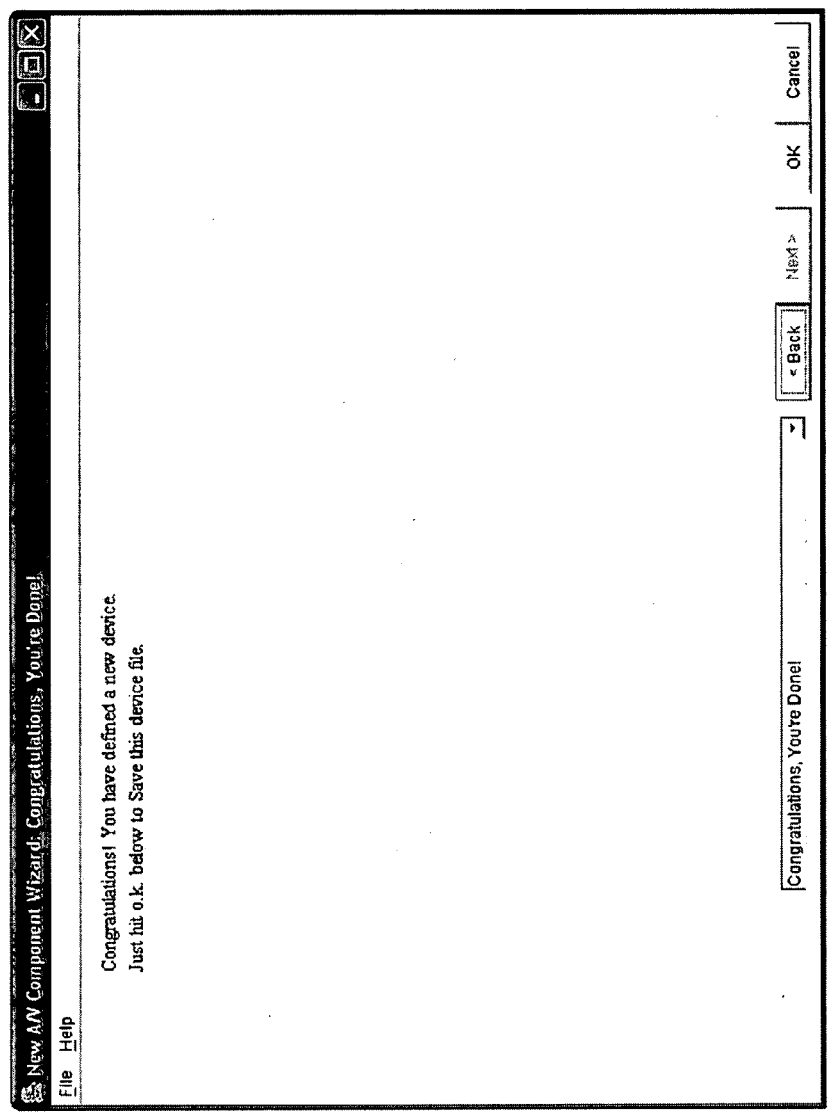
FIG. 20 is a diagram illustrating the You're Done! menu page of the Device Description Wizard of the present invention.
Figure 21:
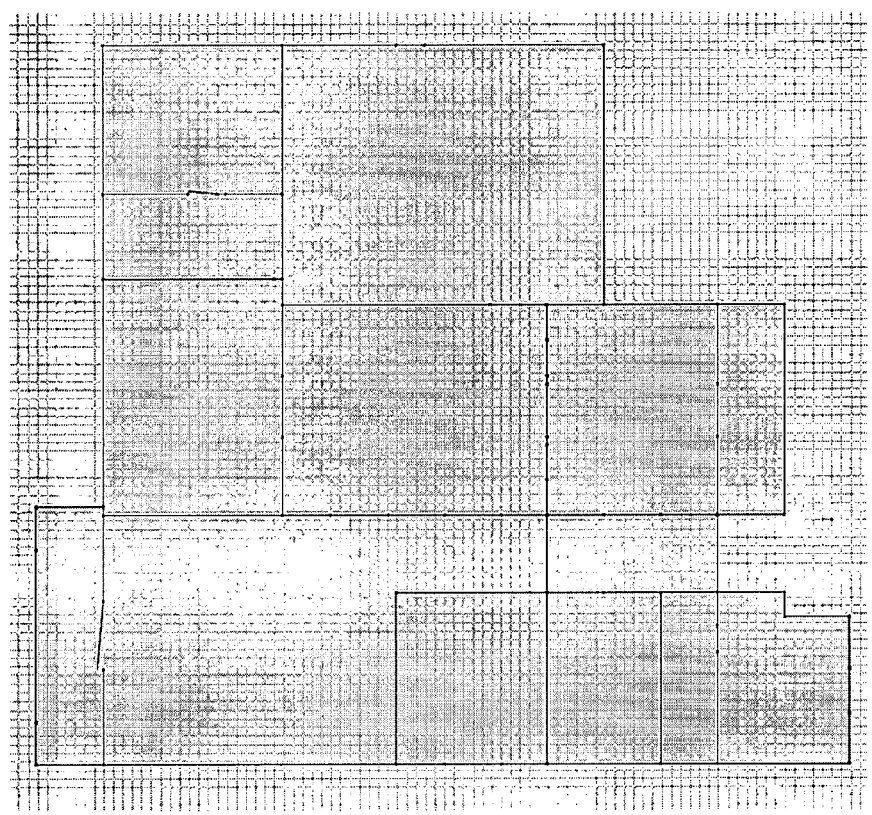
FIG. 21 is a diagram illustrating the Design Module Floor Plan View of the present invention.
Figure 22:
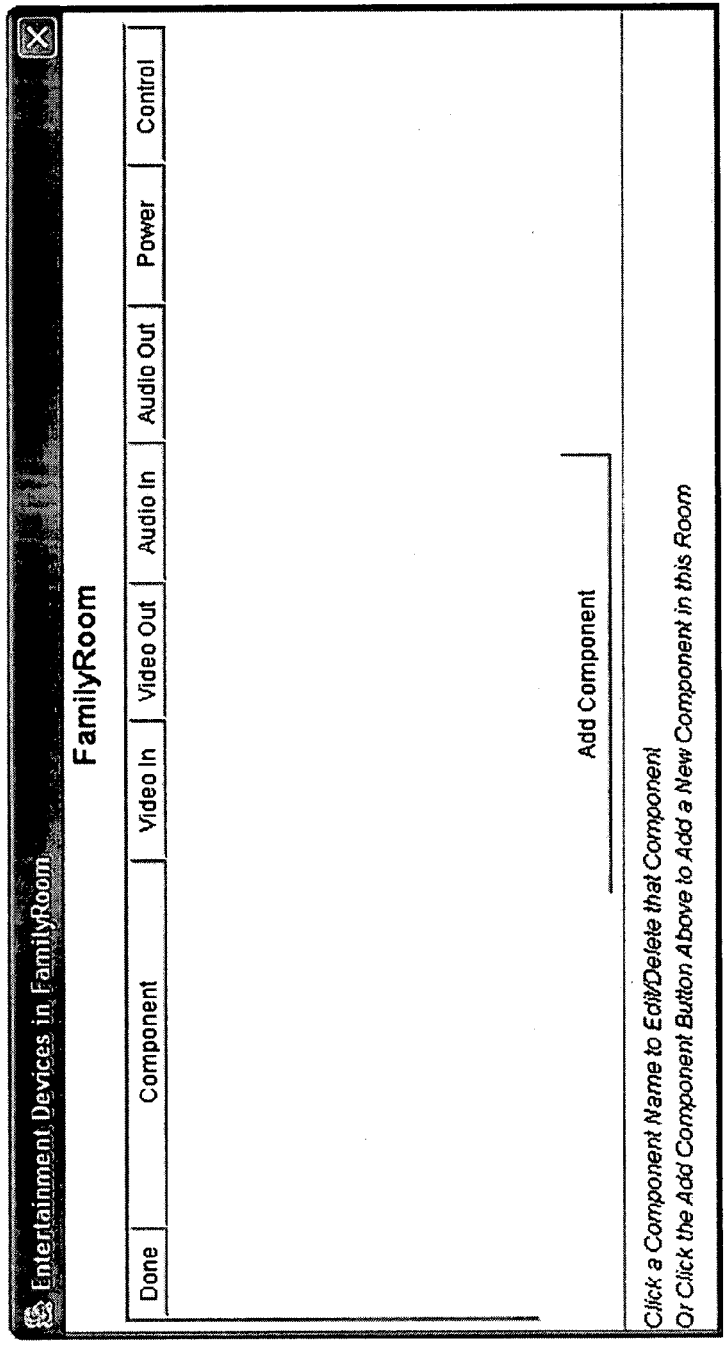
FIG. 22 is a diagram illustrating the Design Module list of AV components in the family room menu page of the present invention with no AV components added yet.
Figure 23:
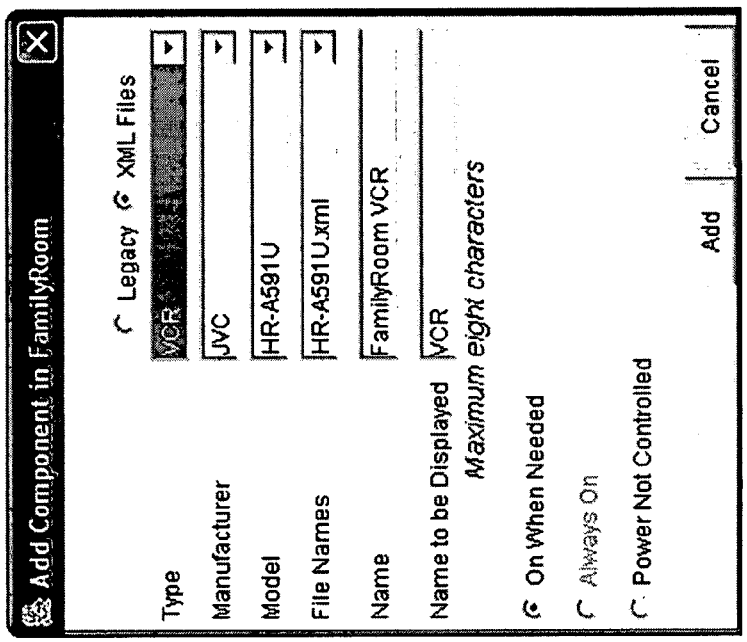
FIG. 23 is a diagram illustrating the Design Module Adding a VCR to the Family Room menu page of the present invention.
Figure 24:
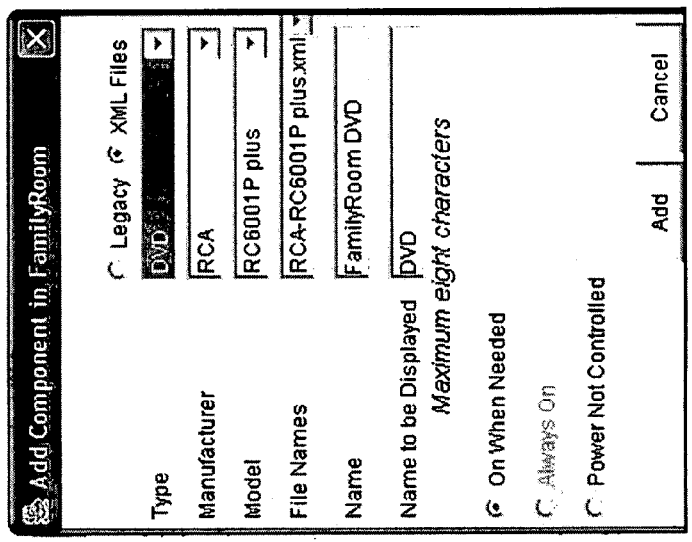
FIG. 24 is a diagram illustrating the Design Module Adding a DVD to the Family Room menu page of the present invention.
Figure 25:
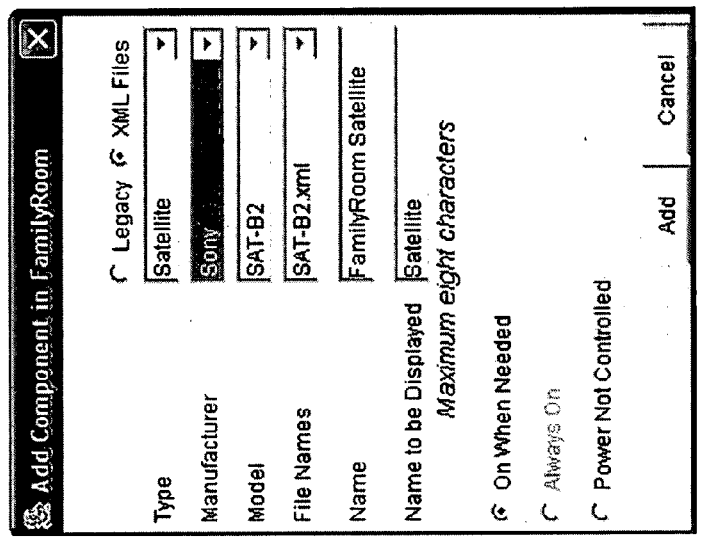
FIG. 25 is a diagram illustrating the Design Module Adding a Satellite Receiver to the Family Room menu page of the present invention.
Figure 26:
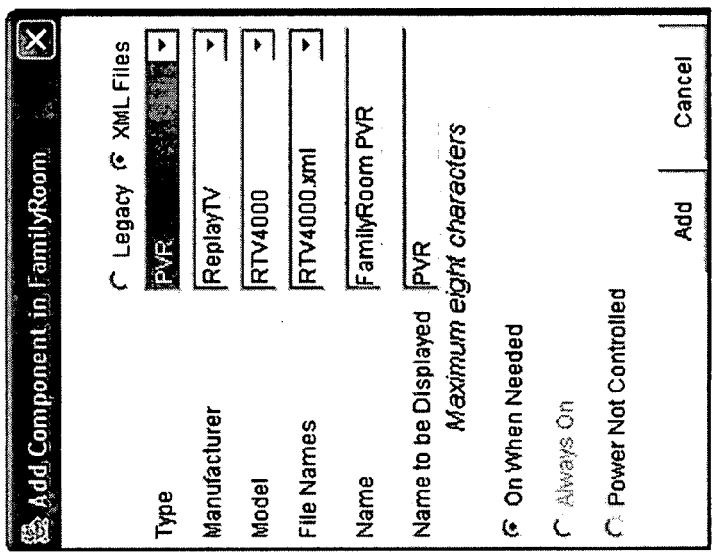
FIG. 26 is a diagram illustrating the Design Module Adding a PVR to the Family Room menu page of the present invention.
Figure 27:
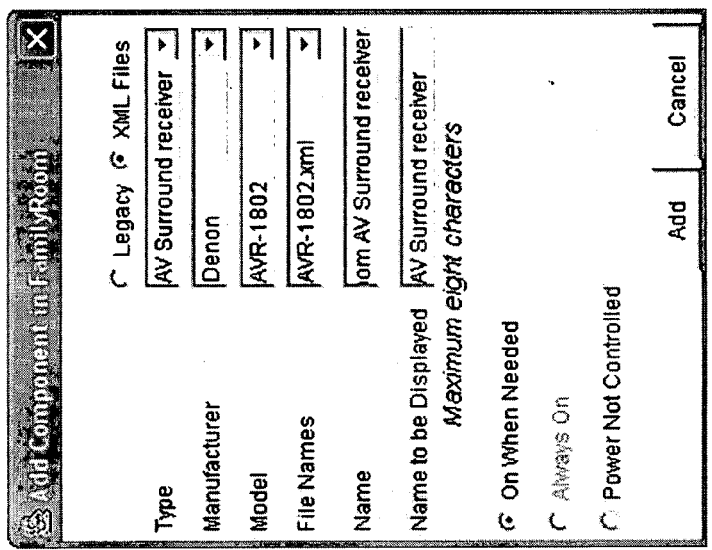
FIG. 27 is a diagram illustrating the Design Module Adding a Surround Receiver to the Family Room menu page of the present invention.
Figure 28:
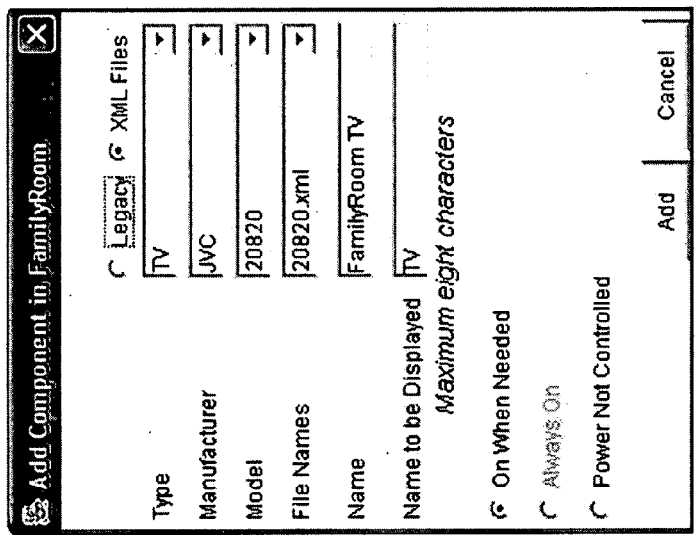
FIG. 28 is a diagram illustrating the Design Module Adding a TV to the Family Room menu page of the present invention.
Figure 30:
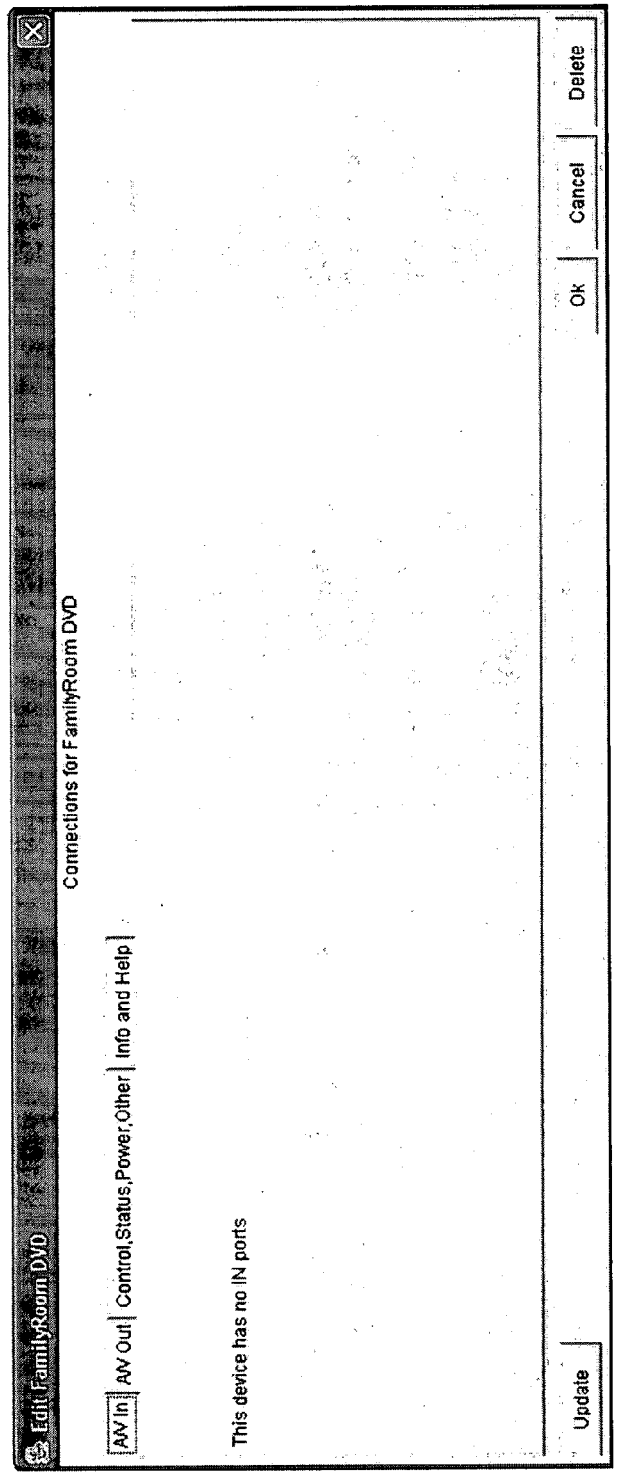
FIG. 30 is a diagram illustrating the Design Module DVD AV Input Ports menu page of the present invention.
Figure 31:
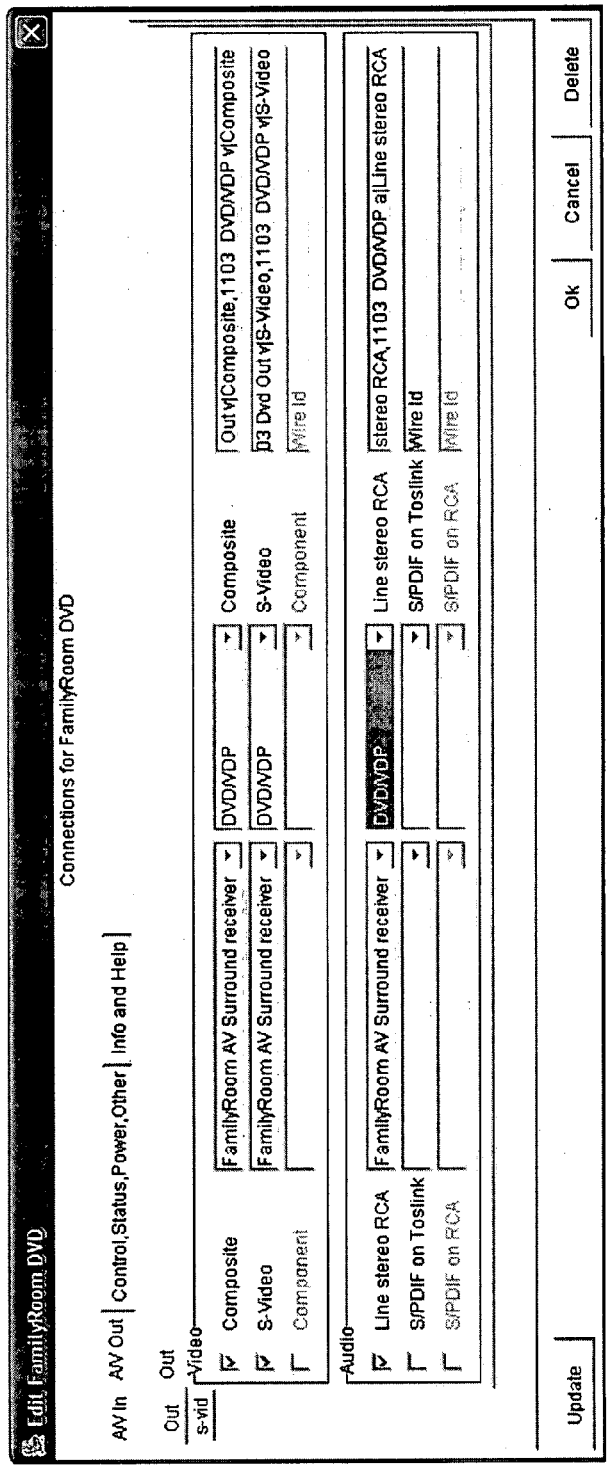
FIG. 31 is a diagram illustrating the Design Module DVD AV Output Ports menu page of the present invention.
Figure 32:
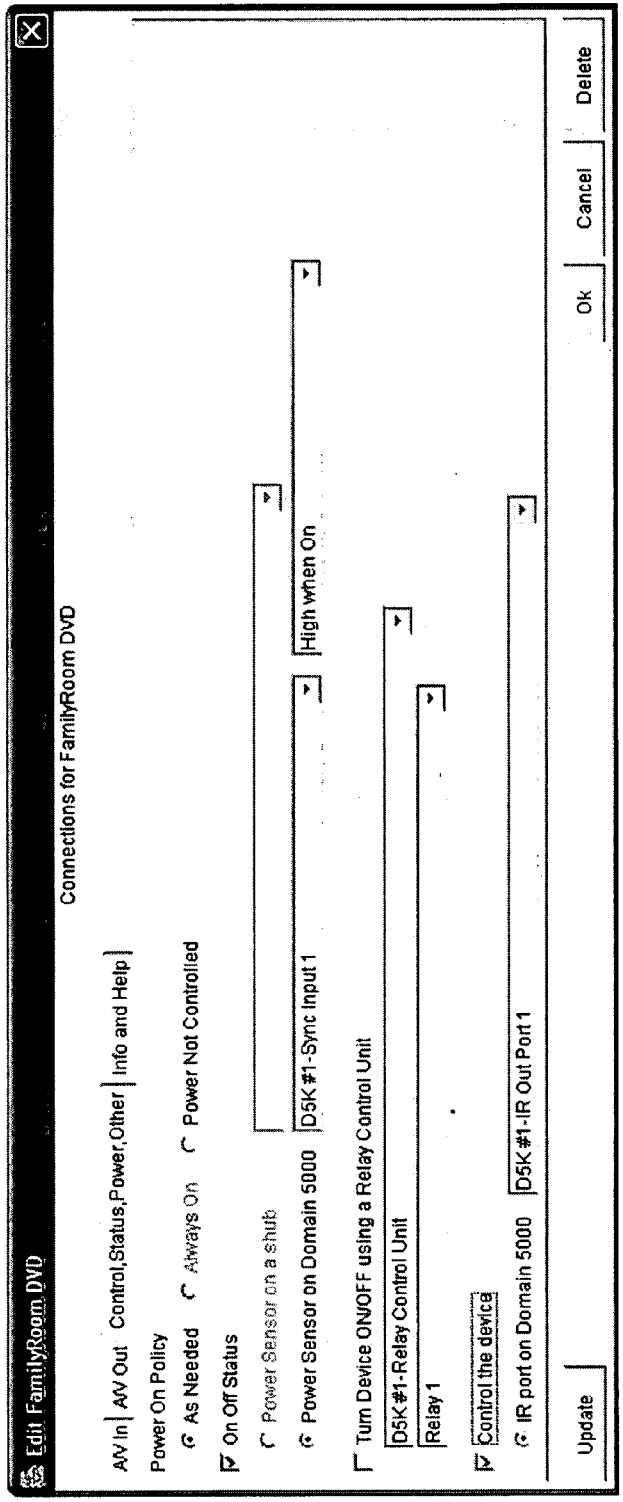
FIG. 32 is a diagram illustrating the Design Module DVD Control, Status, Power, and Other Ports menu page of the present invention.

The control program 15 includes a module called the "Device Description Wizard". The Device Description Wizard module uses a series of menu screens, as shown in FIGS. 3-20, to guide the user through entering all of the relevant data (attributes) about each AV Component and Other Device (i.e. the Description of each AV Component 4), for creating an XML-based "Device Description File" based upon the entered information. This file then contains the information necessary for the controller 1 to install and control that component or device. The component/device data entered using these menu screens includes make and model (FIG. 3), AV inputs (FIG. 4), assignable input ports (FIG. 5), AV outputs (FIG. 6), volume (FIG. 7), control mechanisms (FIG. 8), IR options, import, edit and testing (FIGS. 9-12), RS232 connection and commands (FIGS. 13-16), and transport, menu and keypad (FIGS. 17-19).

For the purposes of this disclosure a "menu screen" (also known as a "menu page") is a visual screen generated for display on an input device showing data and/or data fields, whereby a user can manipulate the menu screen (e.g. enter or change data in data fields, trigger soft keys displayed thereon, activate and select items from drop down menus, etc.) using a computer mouse, keyboard, touch pad, touch sensitive screen, etc. of the input device. The input device can be a separate device such as a computer with a display screen, mouse and keyboard for sending information to the controller 1, or can be an integral part of the controller 1 itself (i.e. computer 11). The menu screens of the present invention preferably include as many choices (and data for those choices) as possible to minimize the amount of data that has to be input manually by the user. For example, all the known makes and models of the various AV components are included in the drop down menus for the component identification menu screen, so that once selected, known default values for many of the remaining component data values are filled in for the rest of the Device Description Wizard screens, which could be overridden by the user if necessary.

Figure 35:
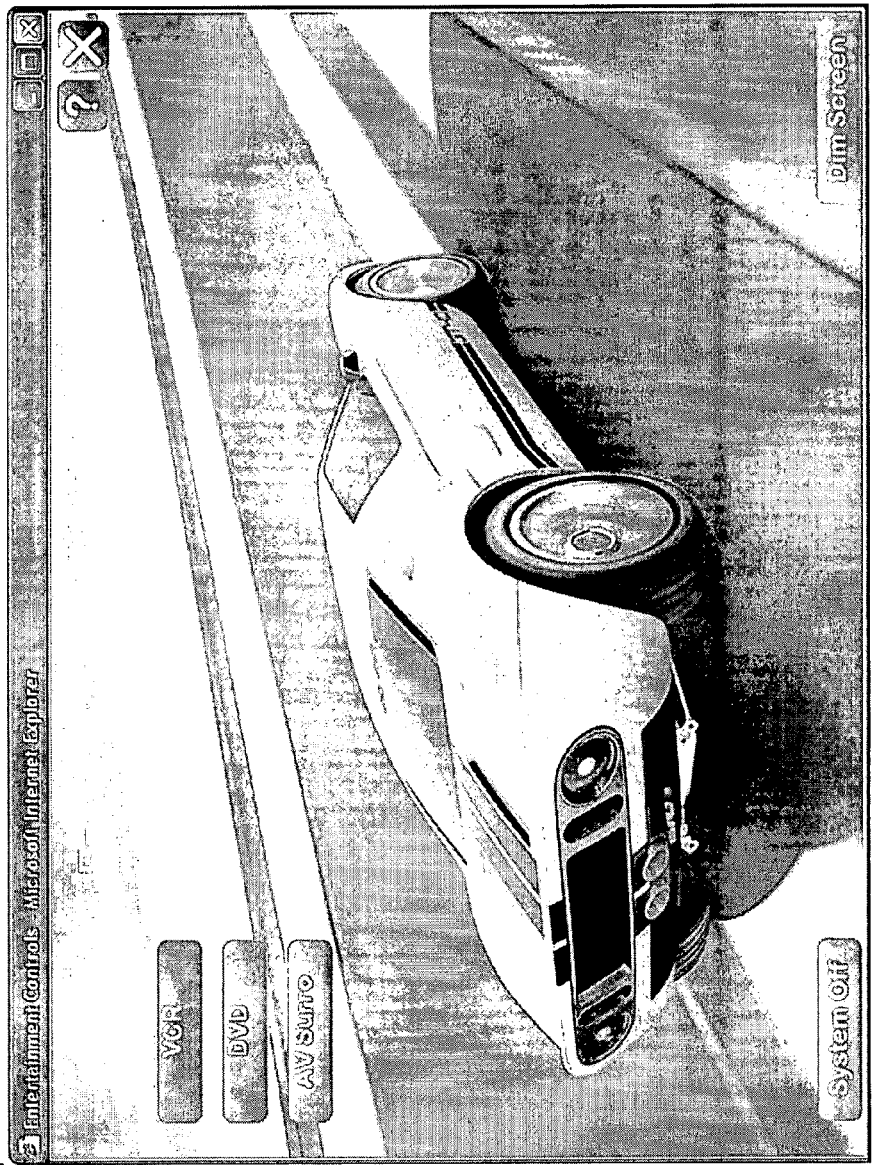
FIG. 35 is a diagram illustrating the Graphical User Interface with all of the AV components turned off of the present invention.
Figure 36:
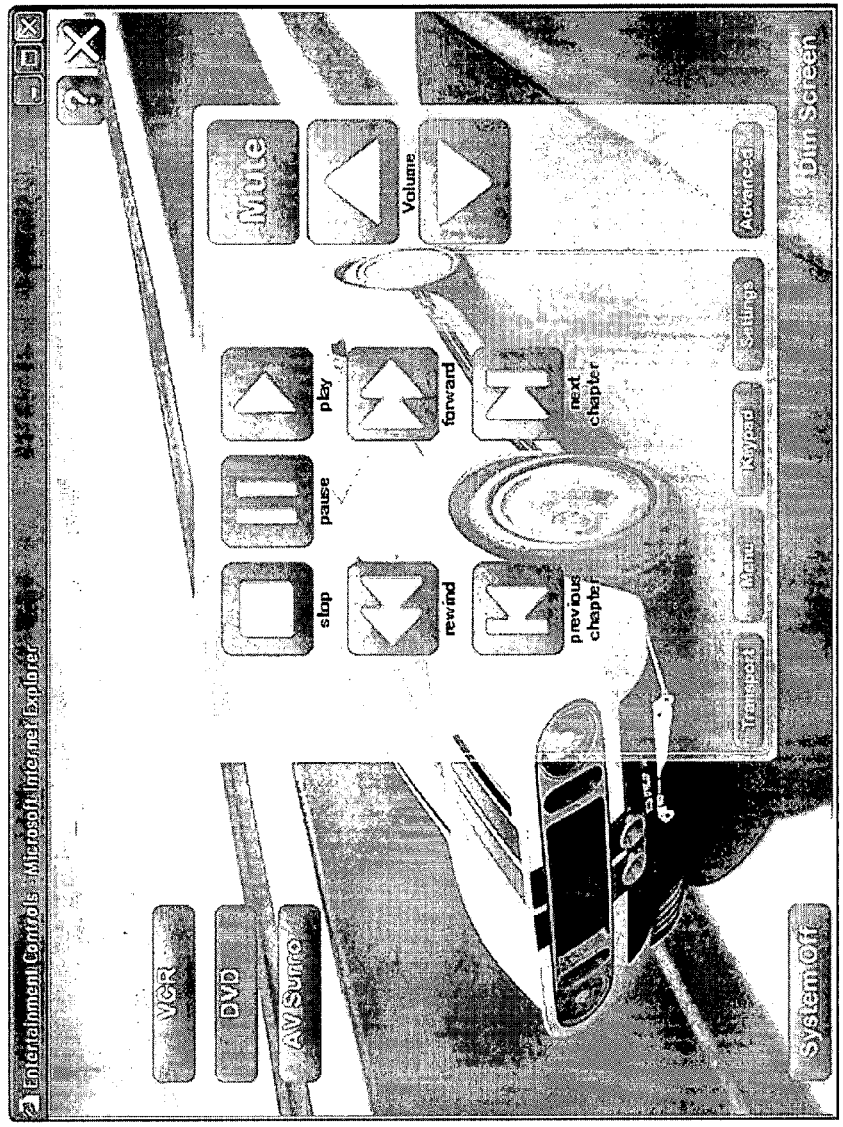
FIG. 36 is a diagram illustrating the Graphical User Interface DVD selected as the Active Source of the present invention.

The control program 15 also includes a module called the "Design Module", which uses a series of menu screens, as shown in FIGS. 21-34, to guide the user through adding AV Components 2 and/or Other Devices 3 with their associated Device Description Files (generated using the Device Description Wizard) to the entertainment system controlled by the control program 15. These figures show that there are two basic tasks necessary to add components to the entertainment system. The first task, as shown in FIGS. 22-29, is to specify what components/devices are in what rooms of the home. This includes identifying the room in which the component/device is placed, as well as the type, manufacturer and model of the component/device. The second task, as shown in FIGS. 30-34, is to identify how the components are physically wired together. This includes identifying the physical wire connections between the various components and devices controlled by the system (e.g. type of connection and wire used, and to what it is connected), as well as control, status and power variables. From this information, the control program 15 is able to determine the best path from a plurality of AV sources to a plurality of video displays and/or speakers in a plurality of rooms, and is able to determine how to control every AV component in all paths. As shown in FIGS. 35-36, the control program 15 also automatically generates a graphical user interface (GUI) for user interfaces 7 in each room, preferably containing a set of commands only for the components/devices that have an effect on that room (i.e. the component/device operates, displays, is located, and/or outputs something in the room, or has an output that eventually operates, displays or outputs something in the room).

The control program creates at least seven major types of software objects based upon the information gathered by the Device Description Wizard and the Design Module:

1. A Connection object, which represents a physical point of connectivity on the AV component 2 or other device 3. Examples include an S-Video connection, an analog audio connection, etc.
2. A Port object includes one or more connection objects that are all communicating the same audio and/or video information and are characterized as being an input to the AV component 2 or other device 3, an output from the AV component 2 or other device 3, or both.
3. A Control object represents a set of commands for controlling an AV component 2 or other device 3. The set of commands could be a known standard set of commands for the device, or a special set of commands uniquely used by that device.
4. A Component/Device object is unique for each component 2 or device 3, and includes the Control object and the Port object(s) for that component/device, as well as the means by which information on the input Port object(s) can be transferred to the output Port object(s). Component/Device objects can be characterized as Source Component/Device objects (for components/devices that provide source data or signals), Intermediate Component/Device objects (for components/devices that transmit or manipulate the source data or signals), or Destination Component/Device objects (for components/devices that receive the source data or signals). Component/Device objects can also be characterized as Video Component/Device objects, Audio Component/Device objects, or both.
5. A Cable object includes one pointer to one output connection of one Component/Device object and one pointer to one input connection of another Component/Device object.
6. A Wire Route is a set of Cable objects that create a path from a Source Component/Device object to a Destination Component/Device object.
7. A Sensor object points to and monitors the power status of a component or device.

There are three basic steps for setting up the home entertainment control system of the present invention. The first step is to create a Device Description File for each component/device using the Device Description Wizard described above. The resulting Device Description File then contains most of the information needed to generate the Component/Device object, including information about all of its Port object(s) and Connection object(s). As stated above, menu screens are used to input the descriptions of each component/device, where the control program 15 then translates that information into a Device Description File of suitable format (e.g. XML). The control program preferably includes a data base of information for most makes and models of components/devices found in the home. Thus, once the make and model of a particular component/device is identified by the user using drop down menus, default values for remaining variables for that particular component/device are displayed without the user having to input them manually (although these default values can be overwritten by the user if necessary). Alternately, if the Device Description File for a particular component already exists (e.g. generated by the component's manufacturer), it can be imported from an external source such as a CD or an internet web site.

The second step is to create a representation of the entertainment system for the particular home in which it operates using the Design Module. Again, menu screens are used to input data such as component/device type, location and interconnection. An interconnection is any signal path allowing a source component/device to send electrical signals or power to a destination component/device. An interconnection can be direct (uninterrupted wire path between the source and destination components/devices), and indirect (wire paths directing the signal/power from the source component/device to or through one or more other components/devices before reaching the destination component/device). Interconnections can also possibly involve wireless signal paths as well. During this process a Component/Device object is created for each AV component 2 and other device 3 in the home, and a Cable object is created for each wire that exists as part of the entertainment system.

The third step is to create a graphical user interface (GUI) for each user input device (user interface) in the home, for selecting an AV source and have it play in a particular room of the house, and/or control any other devices 3 present in that room. This is done by creating a Wire Route from every Source Component/Device object to every Destination Component/Device object via an exhaustive recursive search. For example, for each AV source that has a Wire Route to a Destination Video Component object in a particular room, a video source button will be created on the user interface for that room. For each AV source that has a Wire Route to a Destination Audio Component object in that room, but which does not have a Wire Route to a Destination Video Component object, an audio source button will be created on the user interface for that room. Thus, the GUI for each input device will vary depending upon which room the input device is located, where the GUI displays commands (e.g. soft control keys, command menus, status menus, etc.) only for components and devices have an effect that room. For example, if a given room has a single display device (e.g. television) that can receive signals from two source components located elsewhere in the house (e.g. a satellite receiver and a DVD player), then the input device for that room would include a GUI containing commands only for those three components, and not any commands from other AV components controlled by the control program 15 but do not implicating that room. Each GUI is automatically created by the control program 15 using the component identification and interconnection information gathered from the Device Description Wizard and the Design Module.

Sometimes, a Source Component object may have multiple Wire Routes to a Destination Component object. For example, an AV source may have a direct connection to a particular destination component (i.e. AV speaker and/or video display), as well as one or more indirect connections to the destination component through one or more intermediary AV components. When this happens, all Wire Routes to the Destination Component object are maintained. When the user selects an AV source to play in a particular room of the house, the "best" available Wire Route from the desired AV source to the appropriate type of AV speaker and/or video display in that room is selected. The best Wire Route is determined by discarding all Wire Routes that would disrupt an existing path and then by selecting the Wire Route that uses the highest quality physical wiring and routing electronics to connect the AV source to the AV speaker or video display.

Some components can translate signals from one signal type to another (commonly referred to as "transcoding"). For example, there are three popular video signal types: RCA, component, and S-video. Some AV components have the ability to input signals of one signal type (e.g. RCA), and output that signal with a different signal type (S-video), or even more than one signal type. Translating a signal to a better quality signal type (i.e. component is higher quality than RCA) is referred to upstepping (as opposed to downstepping). The controller program uses this translation information for each such component to not only automatically route signals from the source component to the destination component, but also to do so over the highest quality route possible.

Figure 37:
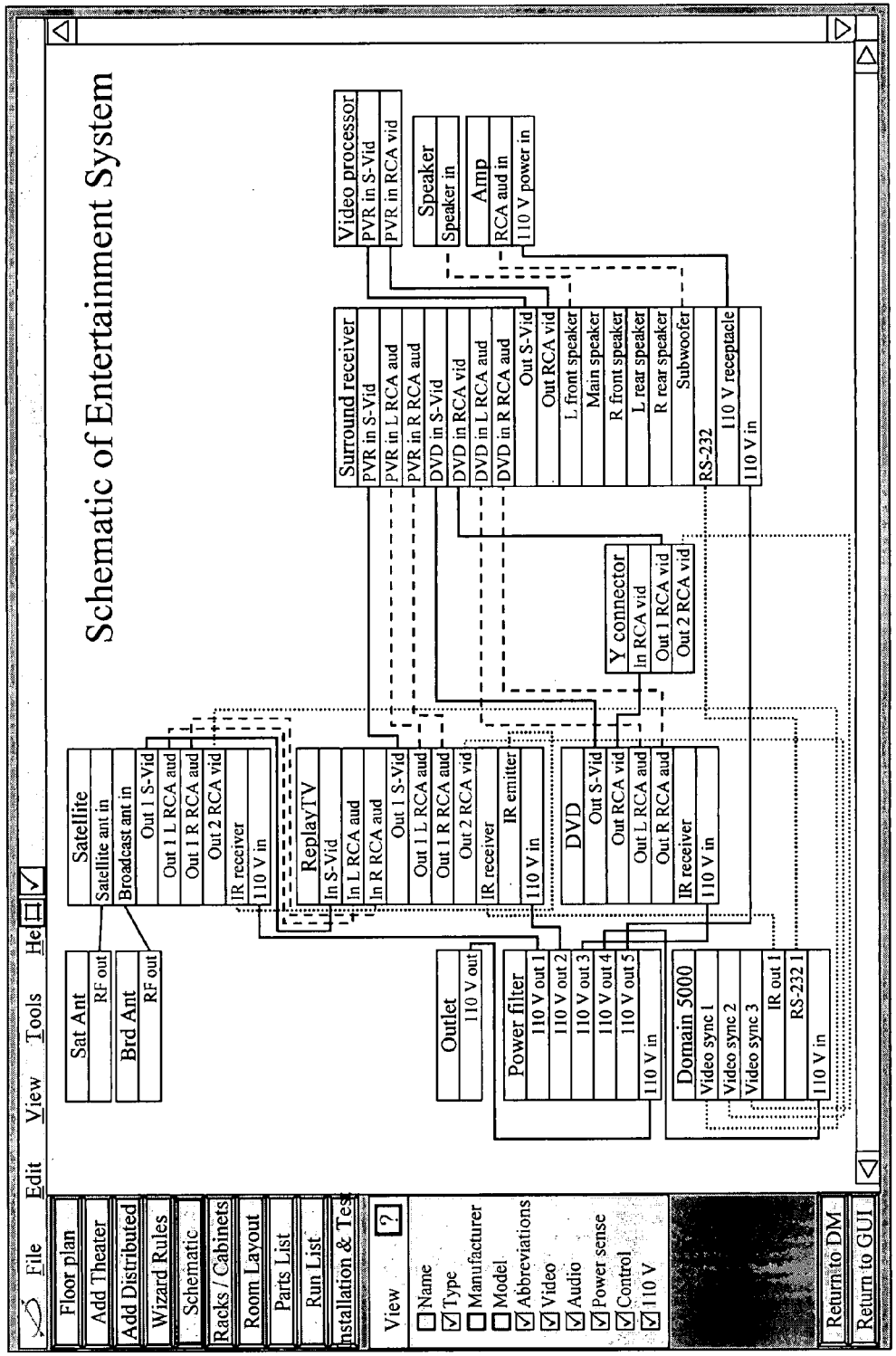
FIG. 37 is a diagram illustrating the Documentation Module Schematic of the Entertainment System menu page of the present invention.
Figure 38:
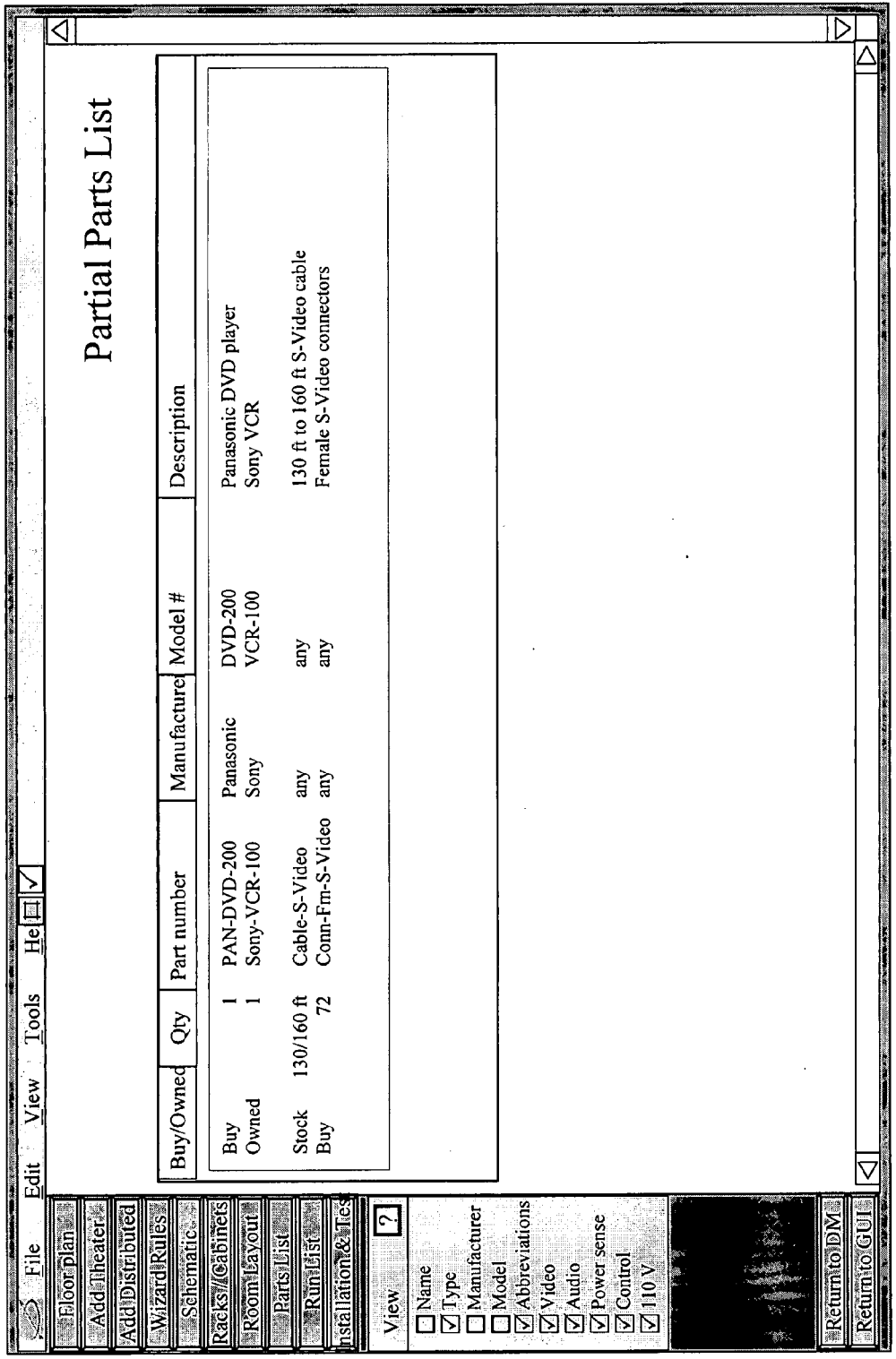
FIG. 38 is a diagram illustrating the Documentation Module Partial Parts List menu page of the present invention.
Figure 39:
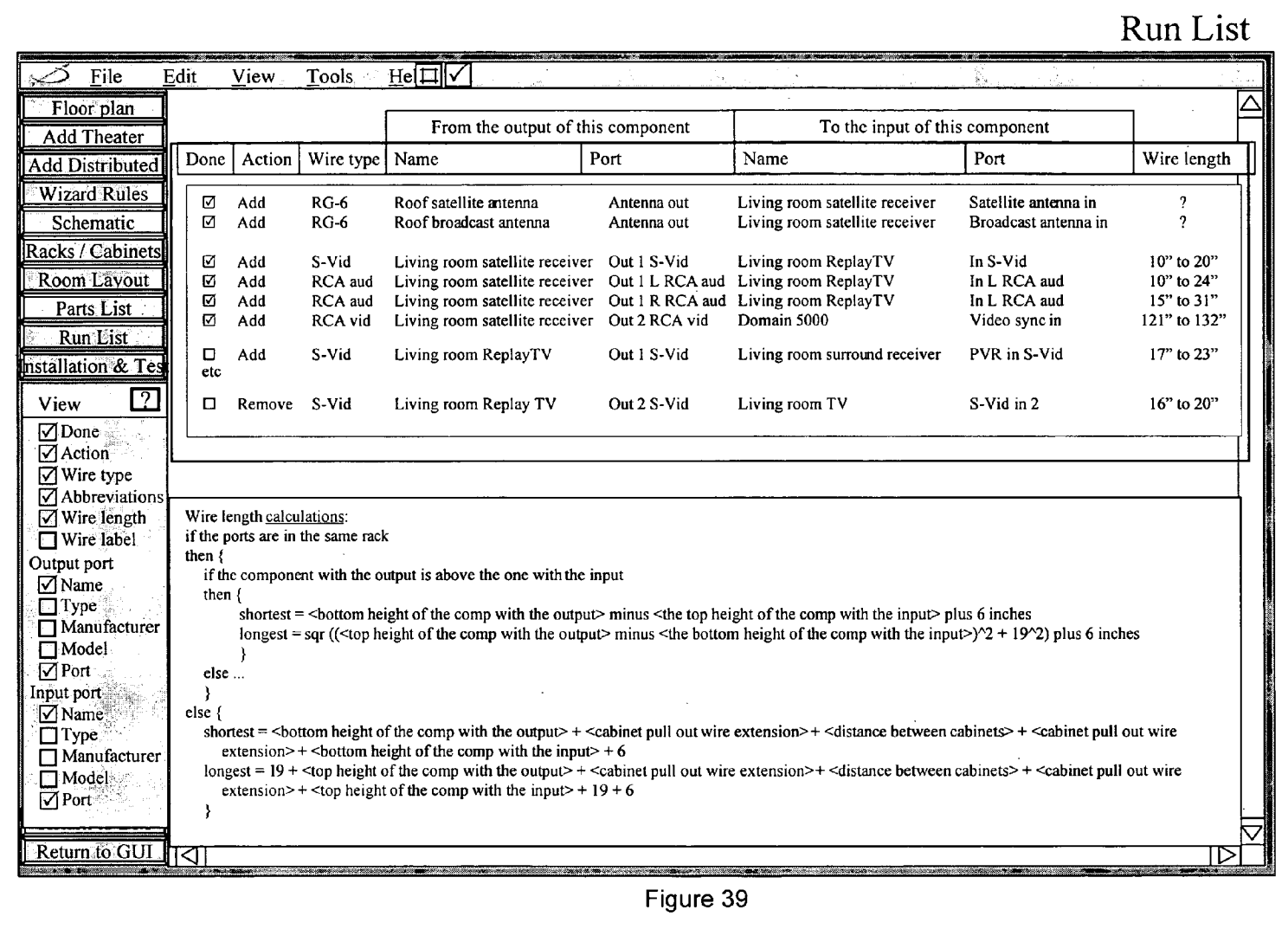
Figure 40:
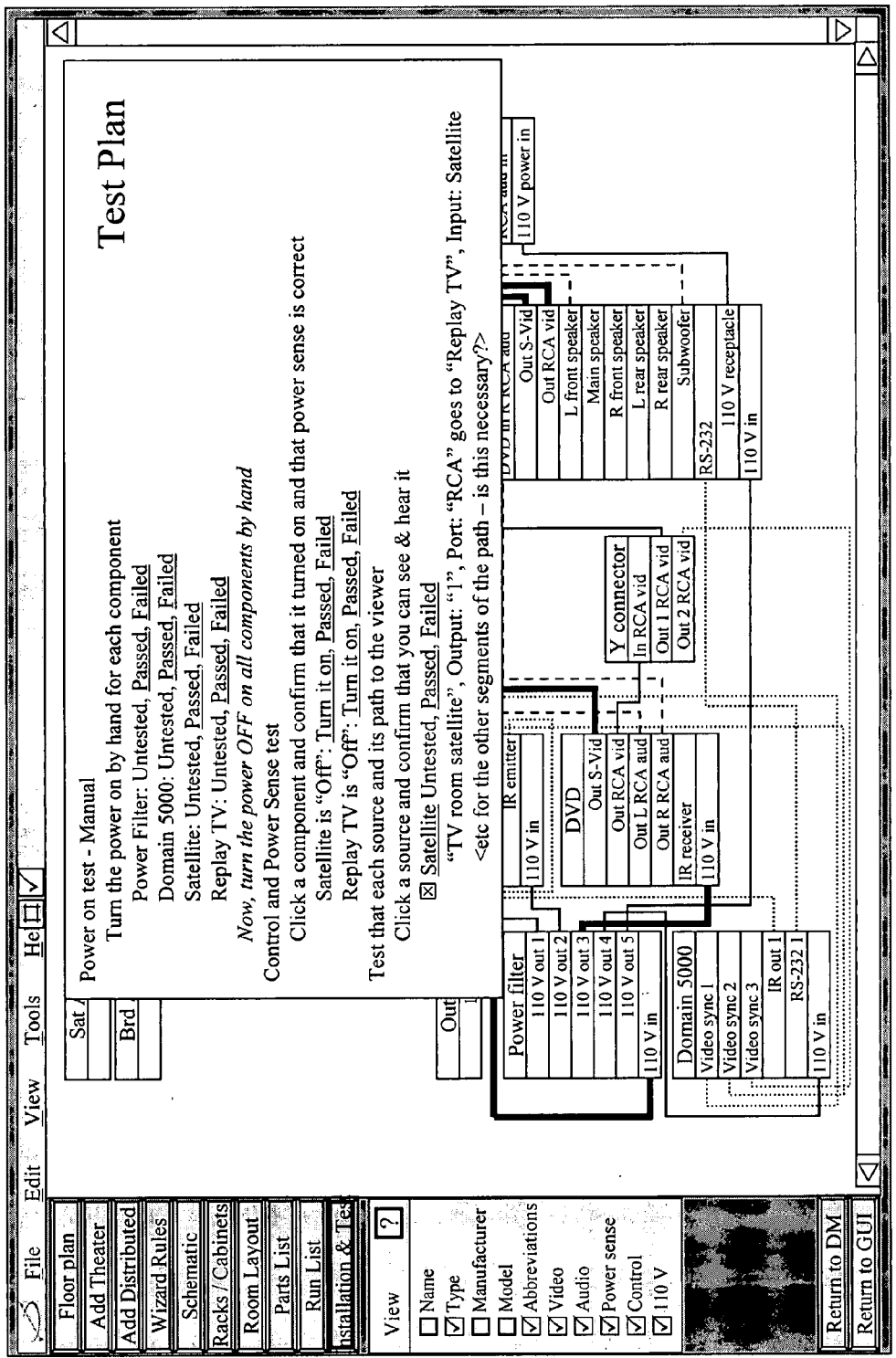
FIG. 40 is a diagram illustrating the Documentation Module Test Plan menu page of the present invention.

The control program 15 also includes a module called "Documentation Module", which uses the information captured by the Device Description Wizard and the Design Module to display schematic diagrams, lists and data useful for installing the control system of the present invention. For example, the Documentation Module generates a schematic of the entire entertainment system, as illustrated in FIG. 37, which shows all the system components, and the wire interconnections therebetween. A parts list is generated, as shown in FIG. 38, listing parts employed by the system, and whether each part is already own, needs to be bought, and/or is in stock. A run list of the wires is generated (see FIG. 39) which identifies each system wire, its length, and whether it has been installed yet. A test plan is generated (see FIG. 40) which shows each source/destination pair within the system, and which highlights which have been successfully tested. This can be extremely useful for larger installations to ensure proper testing of all system interconnections. The test plan can also be used to reduce duplicative route and component testing. For example, if the wires from an amplifier to speakers have been tested, then a subsequent test of a AV source to the speakers need only be tested as far as the amplifier. Moreover, strategic combinations of source/destinations can be omitted from the testing procedure should similar or parallel combinations be successfully tested.

Figure 41:
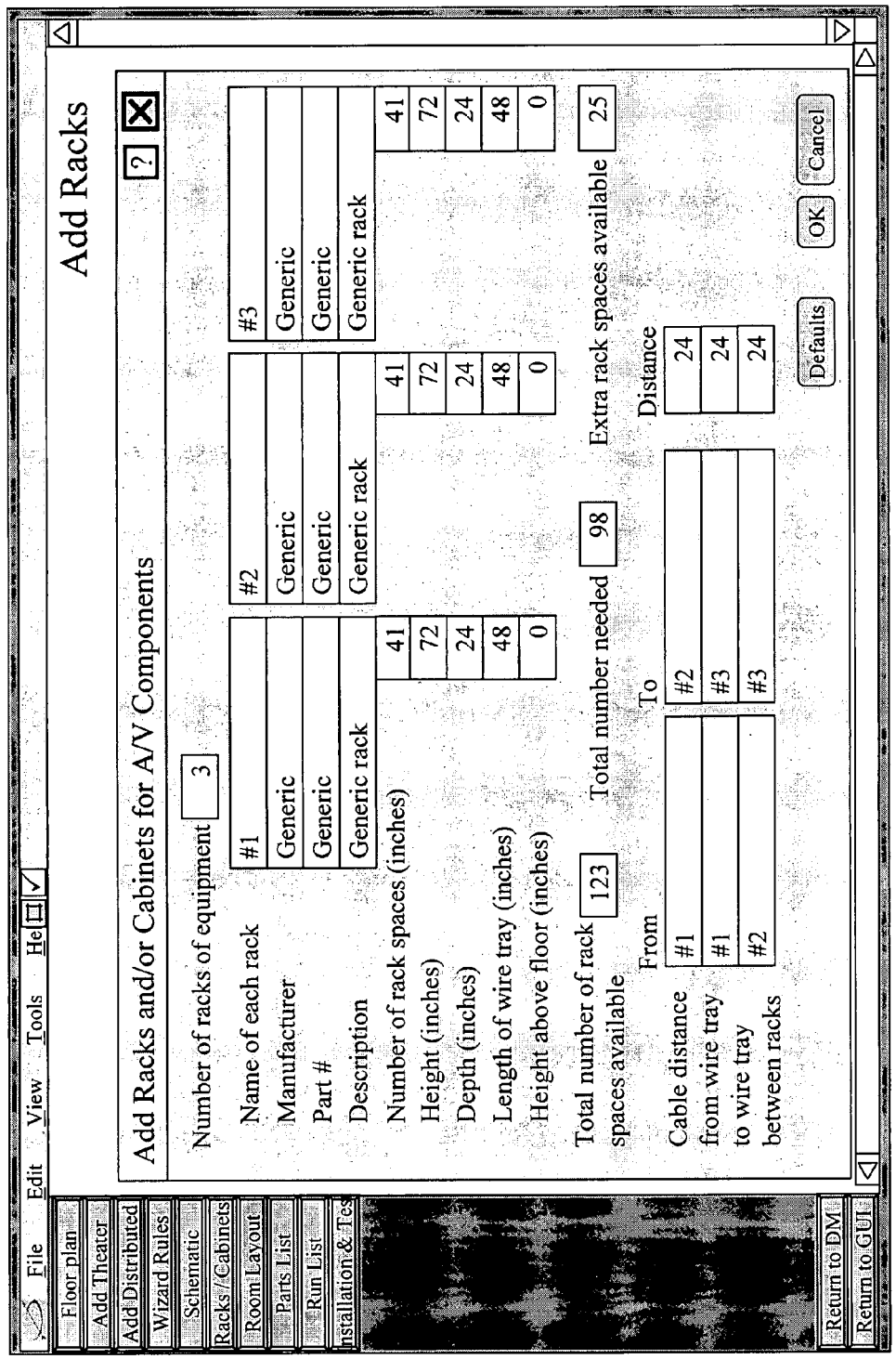
FIG. 41 is a diagram illustrating the Documentation Module Add Racks menu page of the present invention.
Figure 42:
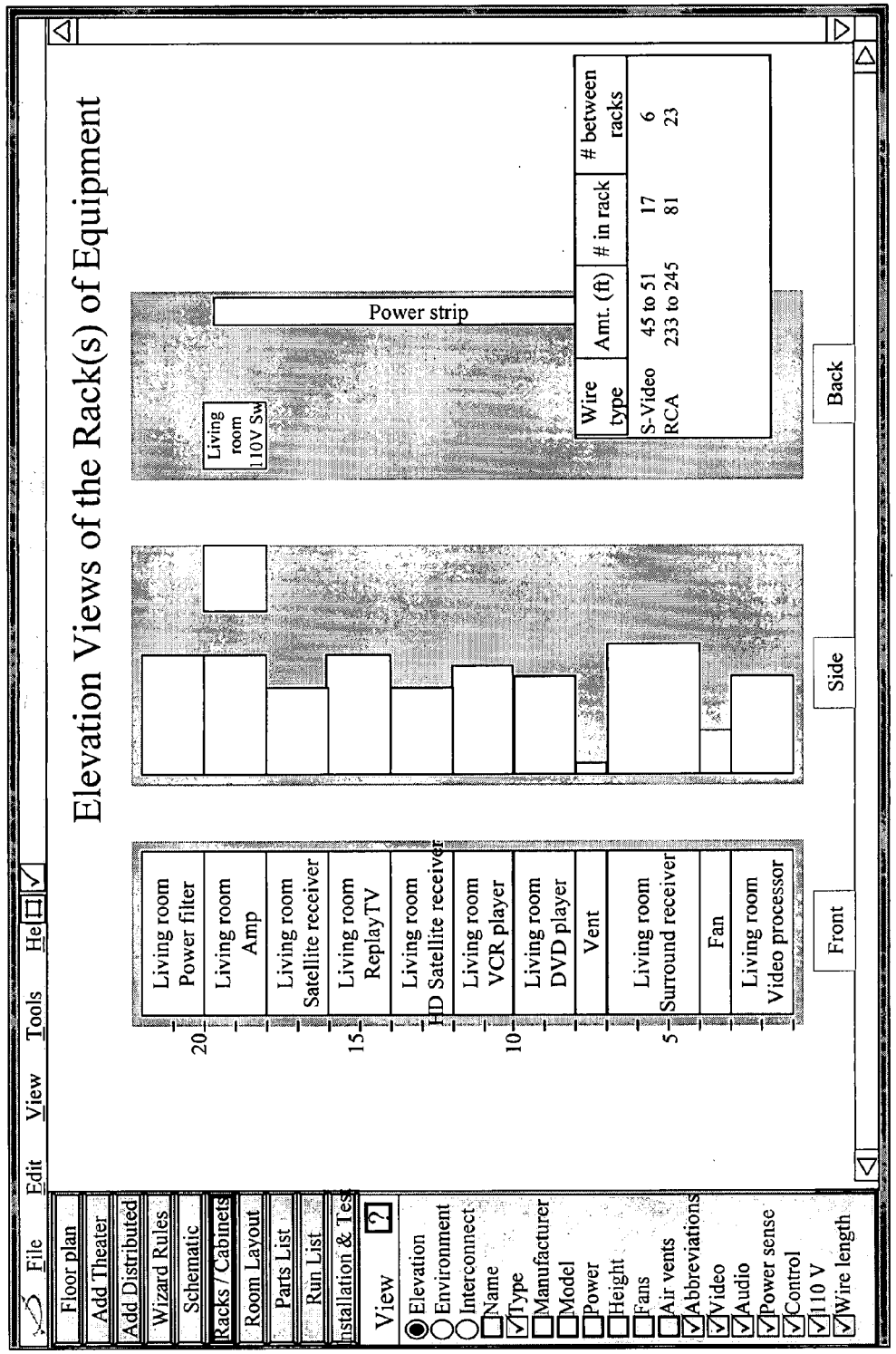
FIG. 42 is a diagram illustrating the Documentation Module Elevation Views of the Rack(s) of Equipment menu page of the present invention.
Figure 43:
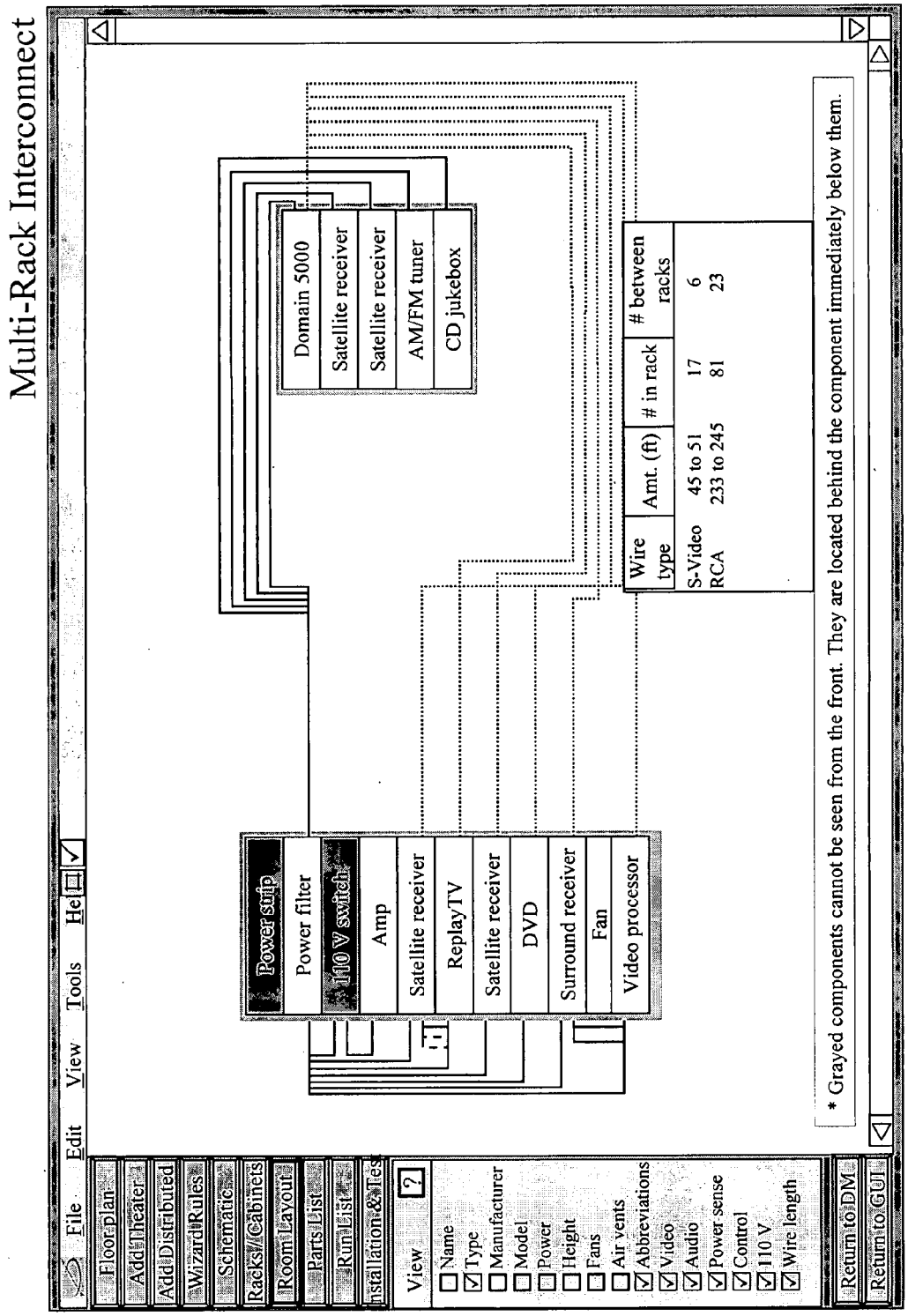
FIG. 43 is a diagram illustrating the Documentation Module Multi-Rack Interconnect menu page of the present invention.
Figure 44:
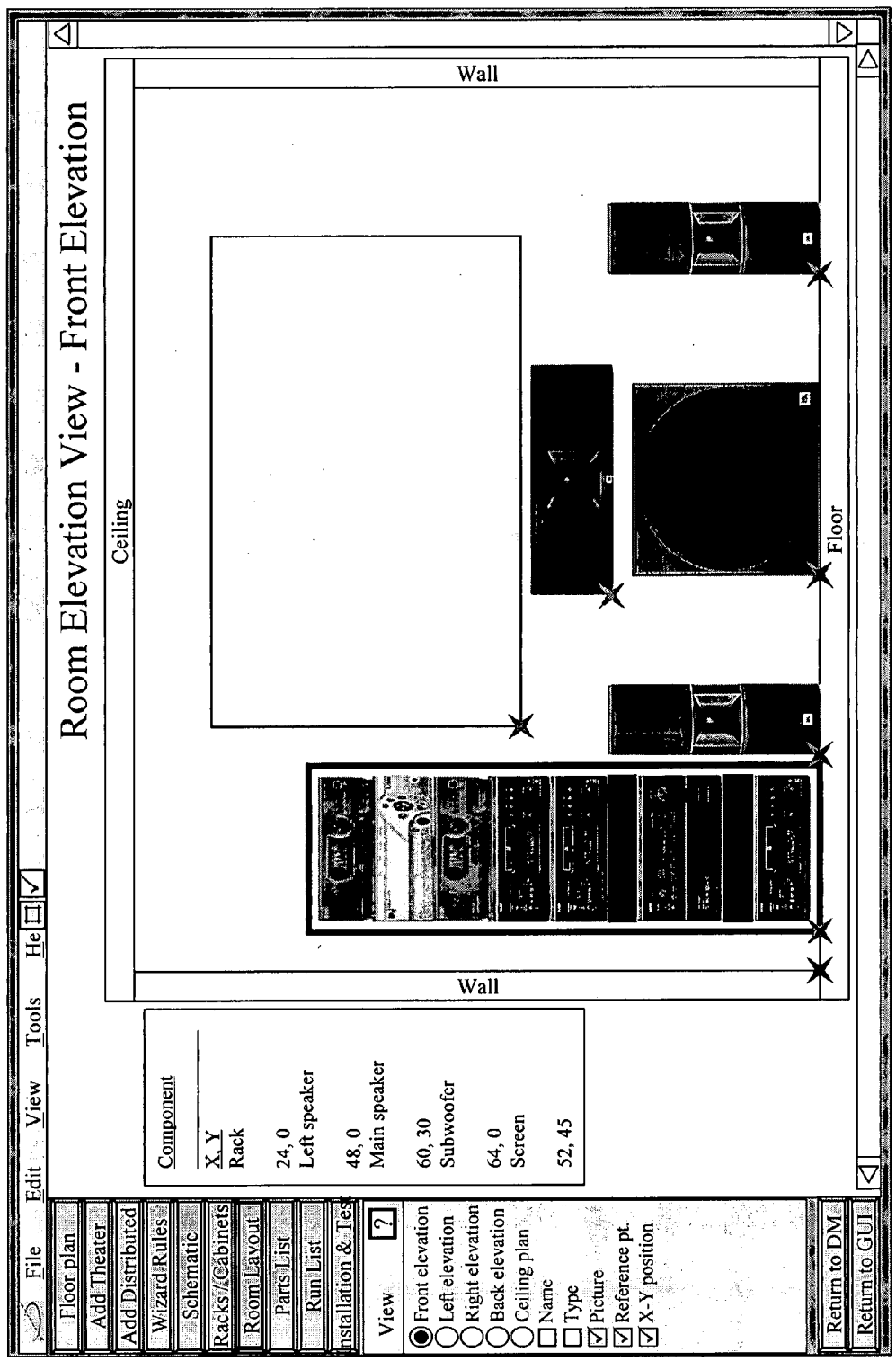
FIG. 44 is a diagram illustrating the Documentation Module Room Elevation View —Front Elevation menu page of the present invention.
Figure 45:
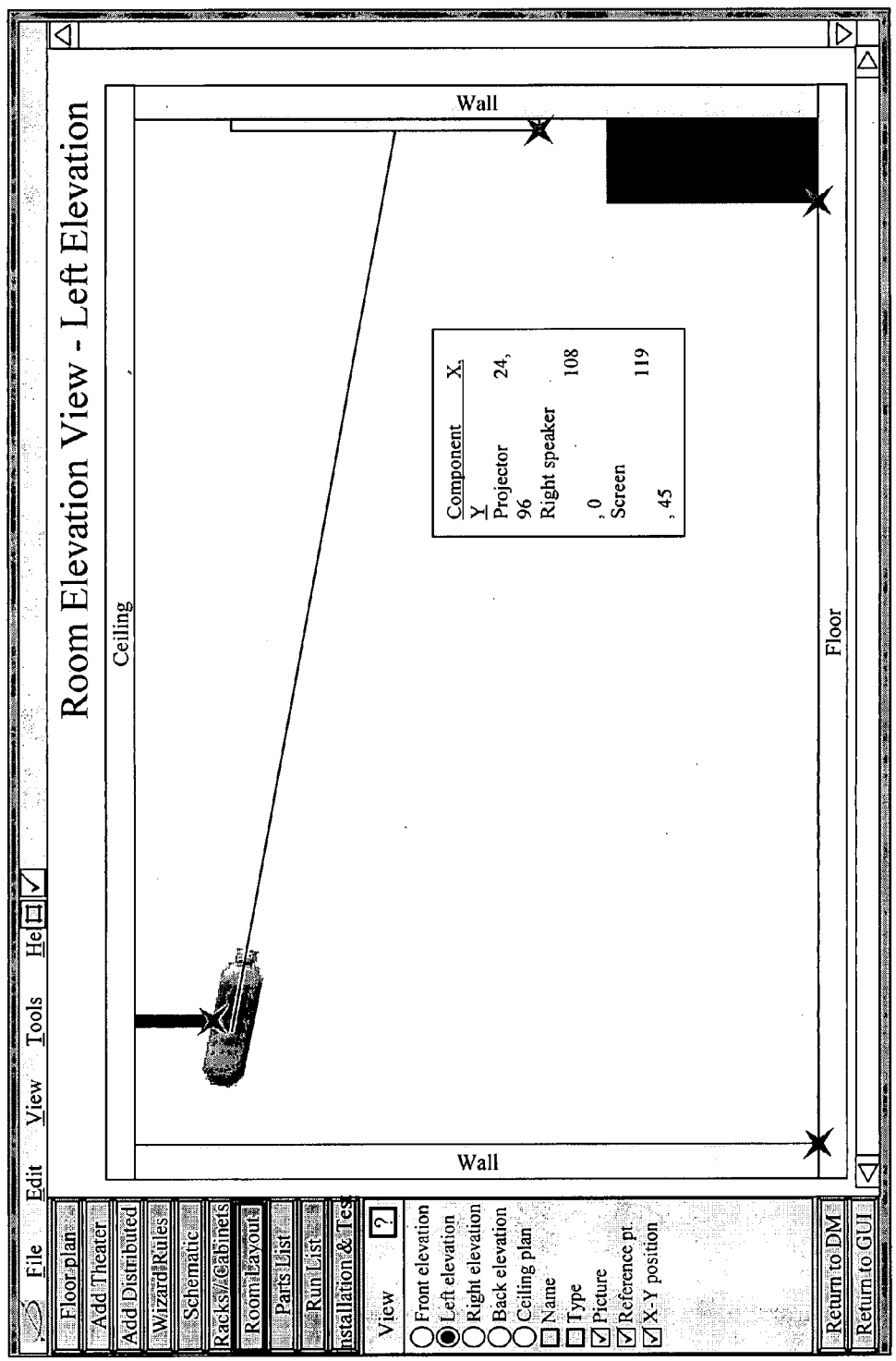
FIG. 45 is a diagram illustrating the Documentation Module Room Elevation View —Left Elevation menu page of the present invention.
Figure 46:
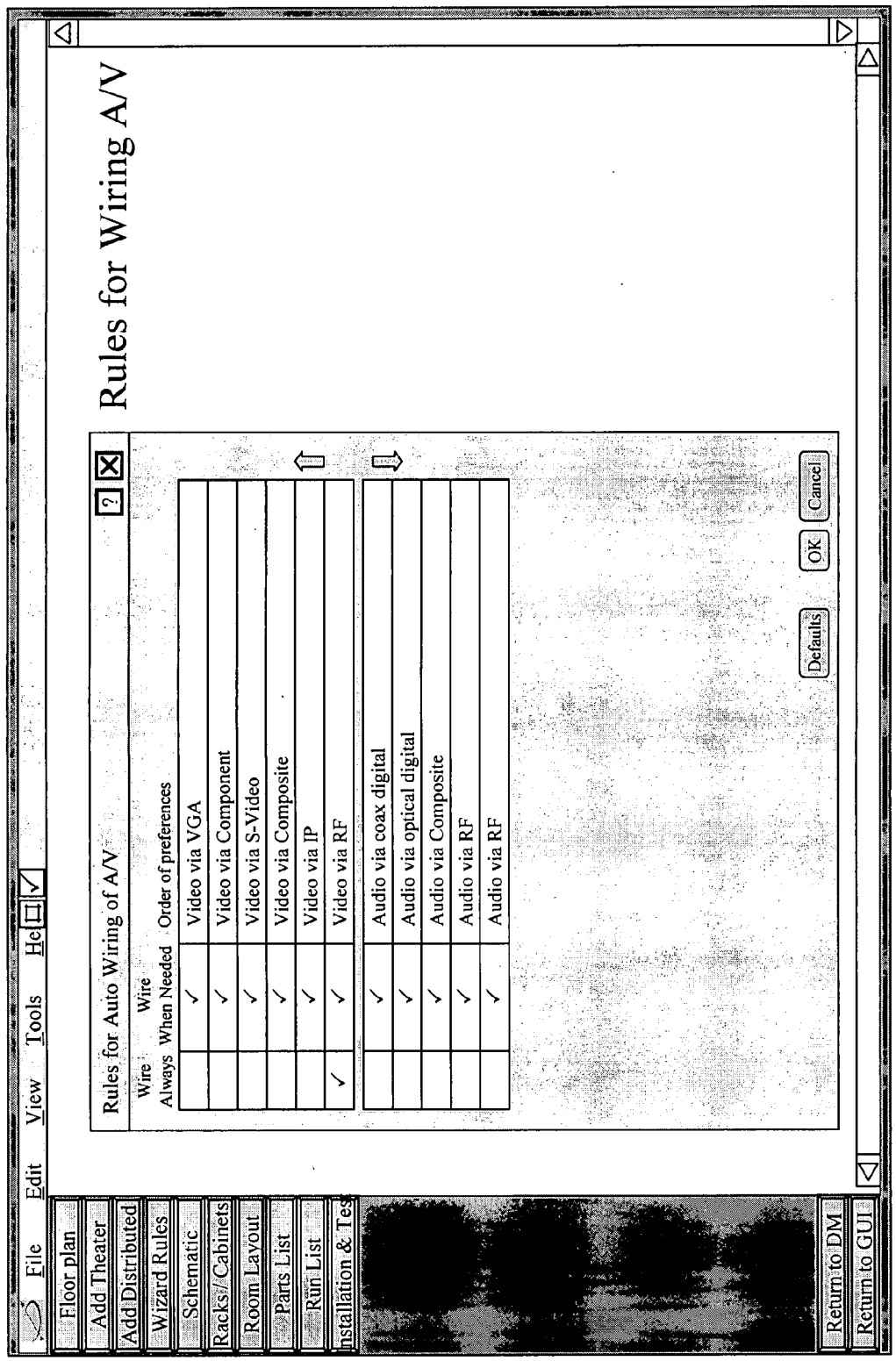
FIG. 46 is a diagram illustrating the Documentation Module Rules for Wiring A/V menu page of the present invention.
Figure 47:
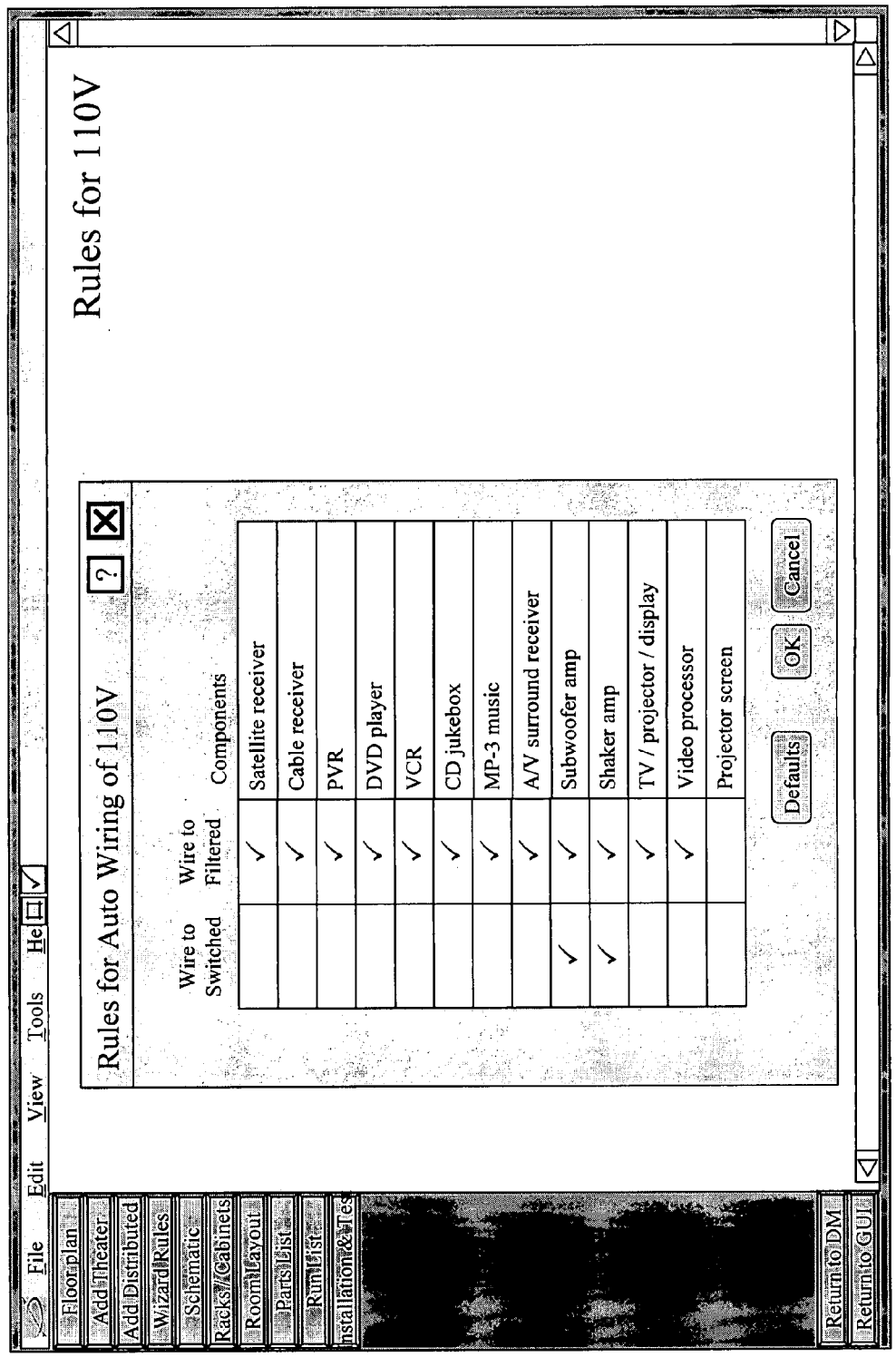
FIG. 47 is a diagram illustrating the Documentation Module Rules for 110V menu page of the present invention.
Figure 48:
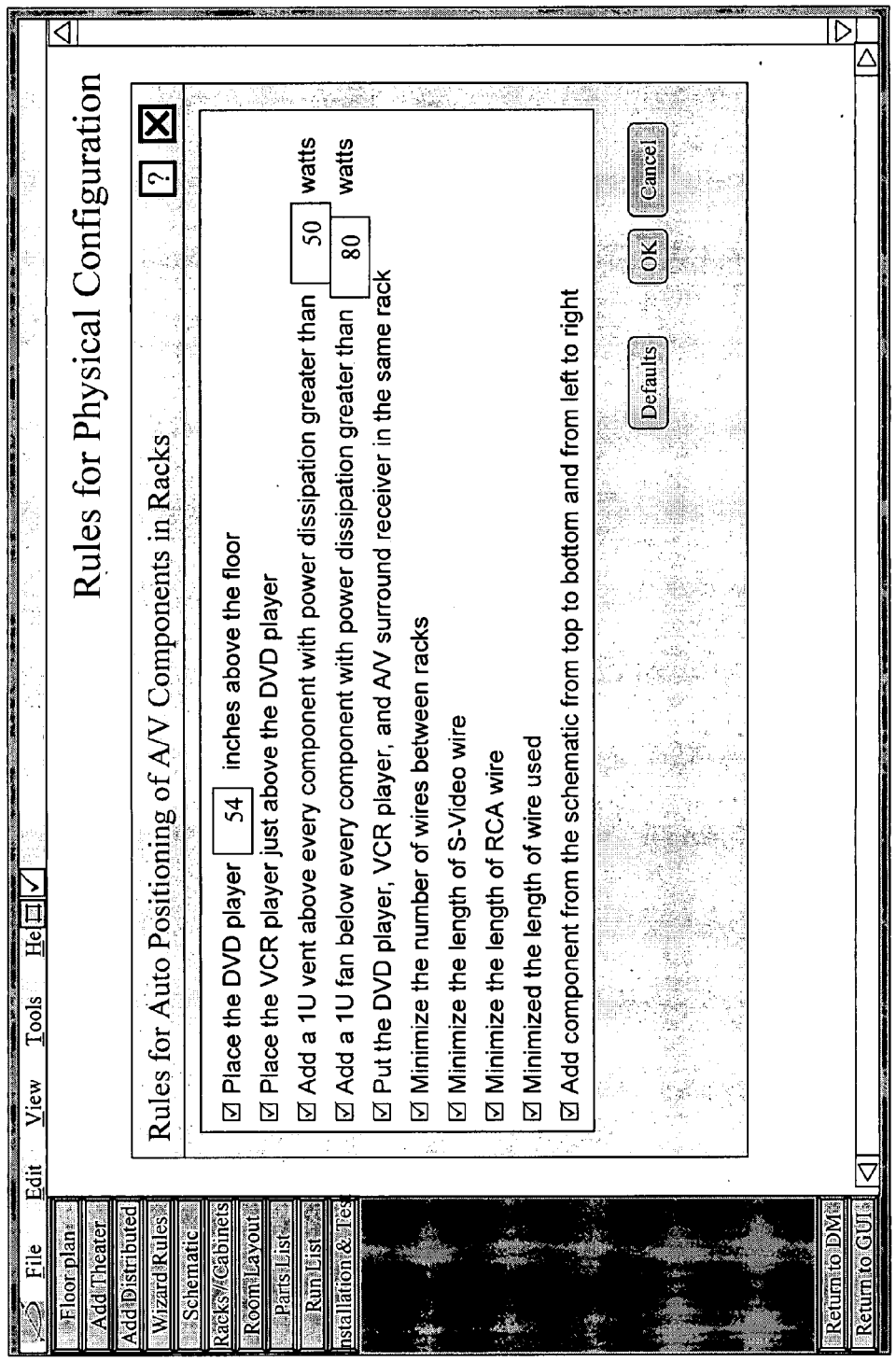
FIG. 48 is a diagram illustrating the Documentation Module Rules for Physical Configuration menu page of the present invention.

With the additional rack information gathered in FIG. 41, the controller 15 also automatically produces multiple elevation views of the racks of AV components (see FIG. 42) and the interconnection of wires within and between racks (FIG. 43). In addition, the Documentation Module provides elevation views of the walls of all rooms with AV components and provides the location of each AV component relative to a specified reference point, as shown in FIGS. 44 and 45. Finally, the Documentation Module can automatically create the run list of wires for interconnecting the AV components and a diagram of how the AV components should be positioned in the AV components racks, which are based on a set of rules selected by the user in the menu screens shown in FIGS. 46-48. Thus, the user can simply enter the set of rules, and the Documentation Module can tell the user where to position the components and devices, and how to best interconnect them to each other (which can supplement, or can even replace, the Design Module that identifies how the components are physically wired together).

One of the variables entered using the Design Module is the wire types (e.g. power, RCA video, copper wire for speakers, etc.) used for the interconnections. This information allows the control program 15 to generate schematics showing different wiring details. For example, one schematic can show all the components, and just the power cable interconnections, for wiring power to the components. Another schematic can just show the video interconnections, for wiring the video connections, and so on. The control program 15 also generates the minimum wire lengths needed for each wire interconnection. This also allows the installer of the system to bring the proper wire lengths to the installation site. Moreover, one of the rules for creating the wires run list is to "minimize the length of wire used" (See FIG. 48), where the controller program 15 calculates the optimum component location to minimize wire length.

C. Algorithms for Schematic Creation

The following is an example algorithm that can be used to place and draw components for creating the system schematic of the type shown in FIG. 37.

I. Create the components such that the width of the component is slightly larger that the longest string of text in the name of the component or one of its inputs of outputs and such that all the components in a column are of the width of the widest component in that column.

II. Arrange the inputs and outputs from top to bottom in the following order—only list the ports that are used
   A. A/V inputs
   B. A/V outputs
   C. Control signal inputs (some, like RS-232, are bi-directional but treat them like inputs)
   D. 110V power input
   E. 110V sockets III. Place the components
   A. In the following columns (and in this order within the columns)
     1. One
       a. Antennas
       b. Domain controller (note the PowerPoint has this in the wrong spot)
       C. Wall outlets
       d. Power filters
       e. Power strips
       f. Triggered power sockets (e.g. AC-1)
       g. Inputs from other rooms 2. Two
      a. Satellite receivers with video outputs
      b. Cable receivers
      c. PVRs
      d. DVD players
      e. VCRs
      f. Satellite receivers without video outputs
      g. MP-3 players
      h. CD jukeboxes
   3. Three
      a. A/V surround receivers
      b. A/V switches
   4. Four
      a. Video processor
      b. Subwoofer amp
      c. Distributed audio amps
   5. Five
      a. TVs, displays & projectors
      b. A/V wall jacks
      c. Speakers (if they are not connected to A/V wall jacks)
   6. Six
      a. Screens (if needed)
      b. Speakers (if connected to a wall jack)
B. Such that they are left justified in their columns
C. Separated by 3 pixels from the bottom of one component to the top of the next lower component
D. Separated by 6 pixels from the right of one column of components to the left of the next column
E. However, if a splitter or line level amp is needed, then insert a new column that contains the splitter or amp in to the right of the column whose output goes into the splitter or amp. That is, put the splitter or amp to the right of the thing it is splitting or amplifying and move all the columns that were there to the right. Additional splitters or amps of that column of components go in the same column.
IV. Draw the wires among the components using the algorithm "DrawTheWires" where video wires are solid blue, audio wires are dotted blue, 110V wires are solid black, power sense lines are dotted green, and control wires are dotted red.

```
DrawTheWires {
  for i = <left column> to <right column>
    for j = <top component> to <bottom component>
      for k = <top output> to <bottom output>    // note you never
                                                  need to draw
                                                  from the inputs
        DrawTheLineFromTheOutputToTheInput
      next k
    next j
  next i
}
DrawTheLineFromTheOutputToTheInput
  if you can draw a line from the output to the right by 3 pixels without
  running into a horizontal line then draw the line from the output to the
  right by 3 pixels
  else {
    move the vertical component of the line it ran into 3 pixels to the
    right
    draw the line from the output to the right by 3 pixels
  }
  if the component to draw to is in the column immediately to the right
of
  the output port's component
  then {
    if you can draw the line up or down to the height of the input with-
out
    overlapping a previously drawn line and without running into another
    component
    then {
      draw the line up or down to the height of the component's input
      draw the line to the right to the component's input
    else {
      for all of the components in the columns of components to the
right
      of this component's column, move them to the right by 3 pixels
      redraw the previously drawn lines
      draw the line from the output of this port an additional 3 pixels
      to the right (again, if it runs into a horizontal line, then the vertical
      component of that line must be moved 3 pixels to the right)
      draw the line up or down to the height of component's input
      draw the line to the right to the component's input
    }
  }
  else
    if the component to draw to is in the same column
    then {
      move all of the components below this component down 3 pixels
      redraw the previously drawn lines
      draw the line from this port out 3 pixels
      draw the line down to 3 pixels above the component immediately
      below this component (if this line overlaps with a previously
drawn
      line then move the appropriate components to the right as done
      above)
      draw the line to the left 3 pixels to the left of the components in
      this column
      draw the line up or down to the height of the component's input
      (again moving components to the right if necessary)
      draw the line to the right to the component's input
    }
    else {
      draw the line to the bottom of the schematic 3 pixels beyond the
      lowest line previously drawn or the lowest component (which
      ever is lower)
      draw the line left (or right) to 3 pixels to the left of the input
      it goes to draw the line up to the input it goes to (if the line
      overlaps a previous line, then move the appropriate components
      to the right)
      draw the line to the right to the input it goes to
    }
  }
 }
}
```

The following is an example algorithm that can be used to create a schematic of the type shown in FIG. 43 for the racks of AV components from the information provided by the Design Module and the additional information collected about the racks:

1. Use the physical configuration rules to determine which component belongs in which rack and where it belongs in its rack.
2. Create all of the components in a rack to be the width of the widest text string that is needed for any component in that rack. Make the height of each component 3 units high where the height is determined by the number of lines of text that needs to be in each box (which is determined by the number of items of each component that is to be viewed).
3. Create air vents to be the height of one line of text.
4. Draw the wires among the components using the algorithm "ShowThePhysicalInterconnect"

```
ShowThePhysicalInterconnect {
  for i = <left rack> to <right rack>
    for j = <top component> to <bottom component>
      for k = <top output> to <bottom output>     // note you never
                                                  need to draw
                                                  from the inputs
        ShowTheLineFromTheOutputToTheInput
      next k
    next j
  next i
}
ShowTheLineFromTheOutputToTheInput {
  if the output is an A/V output
  then draw the line from a point 1/3 up on the left side of the output
    component to the left 3 pixels and then up or down to a point 2/3 up
    (and 3 pixels away) on the left side of the input component
  else draw the line from a point 1/3 up on the right side of the output
    component to a point 2/3 up on the right side of the input component
    (the right side is for 110 V, power sense, and control) in either case
    if the line runs into a previously drawn line, move this line 3 pixels
    away from the component
}
```

It is to be understood that the present invention is not limited to the embodiment(s) described above and illustrated herein, but encompasses any and all variations falling within the scope of the appended claims. For example, while the control system of the present invention is described in the context of components and devices found in rooms within a home, the present invention is applicable to any physical setting which includes a plurality of AV components and/or other devices dispersed among a plurality of locations (e.g. rooms or locations within business or industrial structures, outdoor locations, etc.). The control system of the present invention can treat both AV Components 2 and Other Devices 3 (if any) equally as "controllable components", each possibly having its own attributes identified to the controller 1. Lastly, the Device Description File need not be in XML format, but can be in any format readable by the controller 1.

What is claimed is:

1. A method of operating an entertainment system having a controller that controls a plurality of controllable components in response to a plurality of user interface devices, wherein the controllable components are dispersed among a plurality of locations and are interconnected via interconnections, the method comprising:

identifying attributes for the controllable components to the controller;

identifying locations of the controllable components and interconnections therebetween to the controller;

wherein the controller generates graphical user interfaces for the user interface devices containing commands for operating the controllable components, and wherein the commands included in the graphical user interfaces of the user interface devices vary based on locations of the user interface devices as well as at least some of the identified controllable component attributes, locations and interconnections; and controlling the controllable components by executing the commands of the graphical user interfaces;

wherein at least some of the identified locations for the controlled components includes locations within one or more mounting racks, wherein the identification of locations to the controller includes identifying a plurality of location rules to the controller, and wherein the controller generates a list of the locations of the controllable components in the one or more mounting racks based upon the identified location rules.

2. The method of claim 1, further comprising:

modifying the location rules, wherein the controller modifies the list of controllable component locations based upon the modified location rules.

3. An entertainment system comprising:

a plurality of controllable components that are dispersed among a plurality of locations, wherein each of the controllable components has attributes associated therewith;

a plurality of interconnections between the controllable components;

a plurality of user interface devices that are dispersed among at least some of the plurality of locations;

a controller that generates graphical user interfaces for the user interface devices, wherein the graphical user interfaces include commands for operating the controllable components that vary among the graphical user interfaces based on the locations of the user interface devices as well as at least some of the controllable component attributes, locations and interconnections, and wherein the controller controls the plurality of controllable components in response to the graphical user interface commands executed on the user interface devices; and an input device to identify to the controller the attributes and the locations of the controllable components, and the interconnections therebetween;

wherein at least some of the locations for the controlled components include locations within one or more mounting racks, wherein the controller generates a menu screen on the input device containing a plurality of changeable location rules, and wherein the controller generates a list of the locations of the controllable components in the one or more mounting racks based upon the location rules.

4. The system of claim 3, wherein the controller modifies the list of controllable component locations in response to modifications of the location rules implemented via the input device.

* * * * *